(12) United States Patent
Mori et al.

(10) Patent No.: US 6,909,687 B2
(45) Date of Patent: Jun. 21, 2005

(54) OPTICAL PICKUP WITH A DIFFRACTION ELEMENT CONSIST OF SIX REGIONS PROVIDING SPATIAL VARIATION CORRESPONDING TO A FOCAS STATE

(75) Inventors: Kazushi Mori, Hirakata (JP); Atsushi Tajiri, Mishima-gun (JP); Toyozo Nishida, Suita (JP); Yasuaki Inoue, Nagaokakyo (JP); Yasuhiro Ueda, Hirakata (JP); Masayuki Shono, Hirakata (JP); Minoru Sawada, Yawata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 268 days.

(21) Appl. No.: 09/818,653

(22) Filed: Mar. 28, 2001

(65) Prior Publication Data

US 2001/0028619 A1 Oct. 11, 2001

(30) Foreign Application Priority Data

Mar. 29, 2000 (JP) ..................................... 2000-092304

(51) Int. Cl.$^7$ .............................................. G11B 7/0065
(52) U.S. Cl. ............................. 369/112.07; 369/112.12; 369/112.15; 369/120
(58) Field of Search ....................... 369/112.07, 112.12, 369/112.15, 120, 112.1

(56) References Cited

U.S. PATENT DOCUMENTS

| | | | | |
|---|---|---|---|---|
| 4,733,065 A | | 3/1988 | Hoshi et al. | |
| 4,983,017 A | * | 1/1991 | Tsuji et al. | 359/566 |
| RE35,332 E | * | 9/1996 | Nagahama et al. | 250/201.5 |
| 5,644,565 A | * | 7/1997 | Toda et al. | 369/275.1 |
| 5,790,502 A | * | 8/1998 | Horinouchi et al. | 369/112.09 |
| 5,793,725 A | * | 8/1998 | Tezuka et al. | 369/44.23 |
| 6,125,087 A | * | 9/2000 | Ohnishi et al. | 369/44.23 |
| 6,137,752 A | * | 10/2000 | Sakai | 369/44.23 |
| 6,185,167 B1 | * | 2/2001 | Arai et al. | 369/44.23 |
| 6,314,071 B1 | * | 11/2001 | Alon et al. | 369/53.37 |
| 6,407,973 B1 | * | 6/2002 | Ophey | 369/112.07 |
| 6,538,978 B1 | * | 3/2003 | Holtslag et al. | 369/275.1 |

FOREIGN PATENT DOCUMENTS

JP        3-76035        4/1991

OTHER PUBLICATIONS

Bernacki, et al. "Causes of focus–error feedthrough in optical–disk systems: astigmatic and obscuration methods," Feb. 10, 1994, pp. 735–743, vol. 33, No. 5, Applied Optics.

* cited by examiner

*Primary Examiner*—Gautam R. Patel
(74) *Attorney, Agent, or Firm*—Westerman, Hattori, Daniels & Adrian, LLP

(57) ABSTRACT

A six-segment holographic surface is divided into regions by dividing lines. A four-segment photodetection part is divided into four photodetection parts equal in area by a section line substantially parallel to the radial direction of an optical disk and a section line orthogonal thereto. A main light beam diffracted in the regions of the six-segment holographic surface are condensed as spots at positions apart from each other on opposite sides on a section line of the four photodetection parts, and the main beam diffracted in the regions is condensed as spots in the center of the photodetection parts of the four-segment photodetection part.

10 Claims, 23 Drawing Sheets

FIG. 21 PRIOR ART
(a) OPTICAL DISK IS NEAR
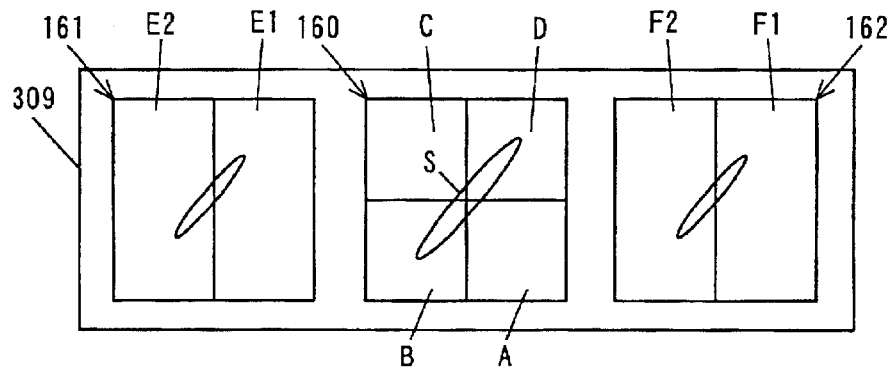
(b) AT FOCAL POINT
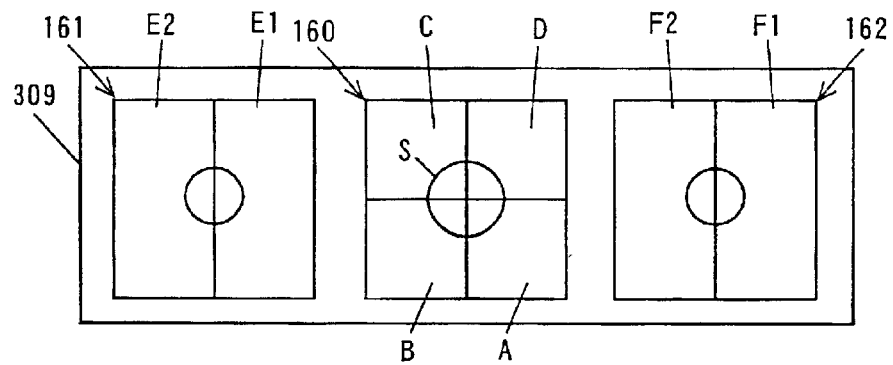
(c) OPTICAL DISK IS FAR
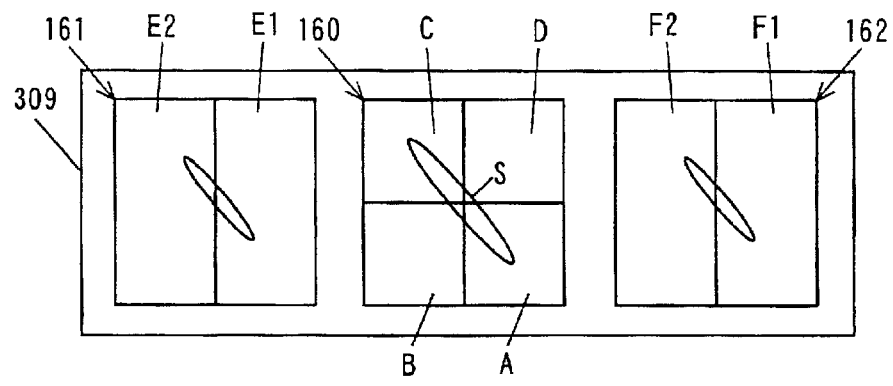

OPTICAL PICKUP WITH A DIFFRACTION ELEMENT CONSIST OF SIX REGIONS PROVIDING SPATIAL VARIATION CORRESPONDING TO A FOCAS STATE

BACKGROUND OF THE INVENTION

1. Field of the Invention

The present invention relates to a holographic optical element, an optical pickup apparatus using the same and an optical recording medium drive having the same.

2. Description of the Background Art

An optical pickup apparatus used as an optical recording medium drive such as an optical disk drive uses a laser beam for recording/reading information to/from an optical recording medium such as an optical disk or for detecting servo signals.

The servo signals are categorized into a focus error signal representing the focal shift of a condensed spot of a laser beam on the optical recording medium, and a tracking error signal representing the shift of the condensed spot from a track on the optical recording medium.

The focus error signal is often detected by the astigmatism method. Meanwhile, the tracking error signal is often detected by the three-beam method when the medium is a ROM optical disk such as a CD (Compact Disk) and a CD-ROM (CD-read only memory). In the case of a recordable optical disk such as a CD-R (CD-recordable) and a CD-RW (CD-rewritable) having no information recorded and therefore having no pit, the three beam method cannot be applied, and the push-pull method or the differential push-pull method which will be described is employed.

FIG. 20 is a schematic view of a conventional optical pickup apparatus for a recordable optical disk. A semiconductor laser device 302 emits a laser beam (light beam). The light beam emitted from the semiconductor laser device 302 is divided by a diffraction grating 303 into three light beams including a main light beam and two sub light beams which are made into parallel beams by a collimator lens 304. The three light beams transmitted through the collimator lens 304 are transmitted through a beam splitter 305, and condensed by an objective lens 306 as a main spot and sub spots positioned on both sides thereof on the recording medium surface of an optical disk 301.

The objective lens 306 is supported by an actuator 310 movably in the radial direction of the optical disk 301 for tracking operation and movably in the direction perpendicular to the recording medium surface of the optical disk 301 for focus operation.

The three returned light beams (reflected light beams) from the optical disk 301 are transmitted through the objective lens 306, reflected by the beam splitter 305, transmitted through an objective lens 307 and a cylindrical lens 308 and detected by a photodetector 309. At the time, based on the combination of the objective lens 307 and the cylindrical lens 308, the three returned light beams are provided with astigmatism for focus error detection.

FIG. 21 is schematic plan views of an example of the photodetector 309 in FIG. 20. FIG. 21(a) shows the state of condensed spots when the optical disk 301 is too near to the objective lens 306. FIG. 21(b) shows the state of condensed spots when the optical disk 301 is in the position of the focal point of the objective lens 306. FIG. 21(c) shows the state of condensed spots when the optical disk 301 is too far from the objective lens 306.

As shown in FIG. 21, the photodetector 309 includes a four-segment photodetection part 160 provided in the central part thereof, and two-segment photodetection parts 161 and 162 provided on both sides of the four-segment photodetector 160. The four-segment photodetector 160 is divided into four photodetection parts A, B, C and D. The two-segment photodetector 161 is divided into two photodetection parts E1 and E2, and two-segment photodetection part 162 is divided into two photodetection parts F1 and F2. The main light beam among the three returned light beams from the optical disk 301 comes into the center of the four-segment photodetection part 160, and the two sub light beams among the returned light beams from the optical disk 301 come into the center of the two-segment photodetection parts 161 and 162, respectively.

As the distance between the optical disk 301 and the objective lens 306 changes, the focal point of the returned light beams change, and the shapes of the condensed spots on the four-segment photodetection part 160 and the two-segment photodetection parts 161 and 162 in the photodetector 309 change as shown in FIG. 21.

When the optical disk 301 is too near to the objective lens 306, as shown in FIG. 21(a), the condensed spot S is in an elliptical shape having its major axis direction set in the direction connecting the center of the photodetection part B and the center of the photodetection part D.

When the optical disk 301 is in the position of the focal point of the objective lens 306, as shown in FIG. 21(b), the condensed spot S is in a circular form in the center of the photodetection parts A, B, C and D.

When the optical disk 301 is too far from the objective lens 306, as shown in FIG. 21(c), the condensed spot S is in an elliptical shape having its major axis direction set in the direction connecting the center of the photodetection part A and the center of the photodetection part C.

Therefore, using output signals PA, PB, PC and PD from the photodetection parts A, B, C and D, respectively in the four-segment photodetection part 160, a focus error signal FES is obtained from the following expression:

$$FES=(PA+PC)-(PB+PD) \quad (1)$$

The focus error signal FES according to the above expression has a negative value when the optical disk 301 is too near, has the value of zero when the optical disk 301 is in a good focus state, and has a positive value when the optical disk 301 is too far. Thus, the direction of the shift of the optical disk 301 from the position of the focal point can be determined based on the sign of the focus error signal FES.

The focus error signal FES is fed back to the actuator 310, and the objective lens 306 is moved in the direction perpendicular to the optical disk 301 to correct the condensed state on the optical disk 301.

When the optical axis of the semiconductor laser device 302 is inclined, a deviation is caused in the light intensity distribution in the condensed spot at the photodetector 309 in the focused state. According to the astigmatism method using the four-segment photodetection part 160 described above, the deviation in the light intensity distribution in the condensed spot caused by the inclination of the optical axis of the semiconductor laser device 302 is less likely to cause an error in the focus error signal FES.

FIG. 22 is views for use in illustration of the principle of tracking servo control by the push-pull method or the differential push-pull method. In the left part of the FIG. 22(a) to (c), the positional relation between the optical disk 301 and the objective lens 306 is shown, while in the right part, the light intensity distribution in the far-field pattern near on the photodetector 309 is shown. In the left part of FIG. 22(a) to (c), the main light beam is denoted by a solid line, while the sub light beams are denoted by broken lines.

In the recordable optical disk 301 such as a CD-R, a pre-groove (groove) 600 used for detecting a tracking error is formed on the recording medium surface. The pre-groove 600 includes raised land parts 601 and recessed groove parts 602. Information is recorded to the land part 601. The tracking error signal represents the shift of the main light beam relative to the land part 601.

The far-field pattern 700 of the main light beam among the returned light beams has a double-humped intensity distribution by the diffraction effect of the light at the edge of the land part 601 or the groove part 602.

As shown in FIG. 22(b), when the condensed spot of the main light beam on the optical disk 301 is positioned in the center of the land part 601, the far-field pattern 700 of the main light beam has a symmetrical, double-humped intensity distribution. In this case, the light intensity at the two photodetection parts A and D is equal to the light intensity at the other two photodetection parts B and C in the four-segment photodetection part 160.

As shown in FIG. 22(a), when the condensed spot of the main light beam on the optical disk 301 shifts to the right relative to the land part 601, the far-field pattern 700 of the main light beam has an asymmetrical, double-humped intensity distribution. In this case, the light intensity at the two photodetection parts A and D is higher than the light intensity at the other two photodetection parts B and C in the four-segment photodetection part 160.

As shown in FIG. 22(c), when the condensed spot of the main light beam on the optical disk 301 shifts to the left relative to the land part 601, the far-field pattern 700 of the main light beam has an asymmetrical, double-humped intensity distribution. In this case, the light intensity at the two photodetection parts B and C is higher than the light intensity at the other two photodetection parts A and D in the four-segment photodetection part 160.

Therefore, if the four-segment photodetection part 160 to detect the main light beam of returned light is considered as a two-segment photodetection part including two divisional parts, i.e., the photodetection parts A and D and the photodetection parts B and C, using the output signals PA, PB, PC and PD from the photodetection parts A, B, C and D, the tracking error signal TES according to the push-pull method can be obtained from the following expression:

$$TES=(PA+PD)-(PB+PC) \qquad (2)$$

The tracking error signal TES according to the expression is zero when the condensed spot of the main light beam on the optical disk 301 is positioned in the center of the land part 601. The signal TES has a positive value when the condensed spot of the main light beam on the optical disk 301 is shifted to the right from the center of the land part 601, and has a negative value when the condensed spot of the main light beam on the optical disk 301 is shifted to the left from the center of the land part 601.

However, if the optical disk 301 is inclined, the far-field pattern 700 on the four-segment photodetection part 160 has an asymmetrical, double-humped intensity distribution even though the condensed spot of the main light beam on the optical disk 301 is positioned in the center of the land part 601.

In an optical pickup apparatus which does not drive an optical system including the objective lens 306 as a whole, when only the objective lens 306 is moved for tracking servo control, the far filed pattern 700 on the four-segment photodetection part 160 has an asymmetrical, double-humped intensity distribution even though the condensed spot of the main light beam on the optical disk 301 is positioned in the center of the land part 601.

In these cases, an apparent tracking error is caused. The apparent tracking error is called "tracking error offset."

Therefore, in order to reduce the tracking error offset caused when the optical disk 301 is inclined or the objective lens 306 is moved, the differential push-pull method is applied. In tracking servo control according to the differential push-pull method, two-segment photodetection parts 161 and 162 on both sides of the four-segment photodetection part 160 are used.

As shown in FIG. 22, the condensed spots by the sub light beams obtained by the diffraction grating 303 shown in FIG. 20 are formed at groove parts 602 on both sides of the land part 601. Thus, the far-field patterns 701 and 702 of the sub light beams among the returned light beams have a double-humped intensity distribution on the two-segment photodetection parts 161 and 162, respectively by the diffraction effect of the light at the edge of the land part 601 or the groove part 602.

As shown in FIG. 22(a), when the optical disk 301 is shifted to the left, the light intensity at the photodetection part E2 is higher than the light intensity at the photodetection part E1 in the two-segment photodetection part 161 and the light intensity at the photodetection part F2 is higher than the light intensity at the photodetection part F1 in the two-segment photodetection part 162.

As shown in FIG. 22(c), when the optical disk 301 is shifted to the right, the light intensity at the photodetection part E1 is higher than the light intensity at the photodetection part E2 in the two-segment photodetection part 161 and the light intensity at the photodetection part F1 is higher than the light intensity at the photodetection part F2 in the two-segment photodetection part 162.

Thus, the asymmetry of the light intensity distribution in the far-field patterns 701 and 701 by the sub light beams is reversed from the asymmetry of the light intensity distribution in the far-field pattern 700 by the main light beam. As a result, using the output signals PA, PB, PC and PD from the photodetection parts A, B, C and D and output signals PE1, PE2, PF1 and PF2 from the photodetection parts E1, E2, F1 and F2, the tracking error signal TES according to the differential push-pull method can be obtained from the following expression:

$$TES=(PA+PD)-(PB+PC)-k\{(PE1+PF1)-(PE2+PF2)\} \qquad (3)$$

where k is a coefficient set so that the tracking error offset is initially zero. Thus, according to the differential push-pull method, the tracking error offset can be compensated.

In recent years, attempts have been carried out into reduction of the size of the optical pickup apparatuses for recordable optical disk using a holographic optical element, similarly to the case of the conventional optical pickup apparatus for reproduction.

FIG. 23 is a schematic view of an optical pickup apparatus having a transmission-type holographic optical element disclosed by Japanese Patent Laid-Open No. 3-76035.

In FIG. 23, the radial direction of an optical disk 501 is the X-direction, the track direction of the optical disk 501 is the Y-direction and the direction perpendicular to the disk surface of the optical disk 501 is the Z-direction.

The optical pickup apparatus shown in FIG. 23 includes a holographic unit 520 and an objective lens 511.

A heat sink block 504 is provided on a stem 502, a sub mount 505 is attached to a side surface of the heat sink block 504 and a semiconductor laser device 506 is attached on the sub mount 505. A photodetector 507 is provided on an upper surface of the heat sink block 504. A cap 503 is provided to surround the heat sink block 504. At an opening at the upper surface of the cap 503, a holographic optical element 508 is provided. At a lower surface of the holographic optical element 508, a diffraction grating 509 is provided, and at an upper surface of the holographic optical element 508, a holographic surface 510 is formed.

The semiconductor laser device 506 emits a laser beam (light beam) in the Z-direction. The light beam emitted from the semiconductor laser device 506 is divided into three light beams, i.e., a 0th order diffracted light beam (main light beam), a +1st order diffracted light beam (sub light beam) and a −1st order diffracted light beam (sub light beam) by the diffraction grating 509 within a plane substantially including the Y- and Z-directions, and the light beams are transmitted through the holographic surface 510.

The three light beams transmitted through the holographic surface 510 are condensed by the objective lens 511 as a main spot and sub spots positioned on both sides of the main spot on the optical disk 501. The objective lens 511 is supported by an actuator 512 movably in the X-direction for tracking operation and in the Z-direction for focus operation.

The three returned light beams (reflected light beams) from the optical disk 501 are diffracted within a plane substantially including the X- and Z-directions by the holographic surface 510, and detected by the photodetector 507. As shown in FIG. 23, the holographic surface 510 has an asymmetrical pattern, and provides the three returned light beams from the optical disk 501 with astigmatism.

In the optical pickup apparatus in FIG. 23 using the holographic optical element 508, the operation described with reference to FIG. 21 and FIG. 22 can similarly be achieved. In this case, the photodetector 507 has a four-segment photodetection part 160 and two two-segment photodetection parts 161 and 162 similarly to the case of the photodetector 309 in FIG. 21.

Thus, using the holographic optical element 508, the optical system can be formed into a unit since the semiconductor laser device 506 and the photodetector 507 are used in a chip form. As a result, the size of the optical pickup apparatus can be reduced.

In the semiconductor laser device 506, however, the lasing wavelength varies depending upon the ambient temperature. The variations in the lasing wavelength cause the diffraction angle of returned light beams on the holographic surface 510 to change.

FIG. 25 is schematic plan views showing the movement of the condensed spots on the photodetector 507 by variations in the lasing wavelength of the semiconductor laser device 506 in the optical pickup apparatus in FIG. 23.

At the time of adjustment, as shown in FIG. 25(b), the condensed spot S of the main light beam is positioned in the central part of the four-segment photodetection part 160. When the lasing wavelength of the semiconductor laser device 506 is shorter at a lower ambient temperature, as shown in FIG. 25(a), the condensed spot S on the four-segment photodetection part 160 moves in the direction opposite to the diffraction direction (−X-direction). Conversely, when the lasing wavelength of the semiconductor laser device 506 is longer at a higher ambient temperature, as shown in FIG. 25(c), the condensed spot S on the four-segment photodetector 160 moves in the same direction as the diffraction direction (+X-direction). Consequently, the level of the focus error signal FES is lowered, and the detection accuracy of the focus state is lowered.

SUMMARY OF THE INVENTION

It is an object of the present invention to provide an optical pickup apparatus allowing a focus state at an optical recording medium to be accurately detected if the diffraction angle of a returned light beam changes by a variation in the wavelength of a light source.

Another objet of the present invention is to provide an optical recording medium drive allowing a focus state at an optical recording medium to be accurately detected if the diffraction angle of a returned light beam changes by a variation in the wavelength of a light source.

Yet another object of the present invention is to provide a holographic optical element allowing a focus state at an optical recording medium to be accurately detected if the diffraction angle of a returned light beam changes by a variation in the wavelength of a light source.

An optical pickup apparatus according to one aspect of the present invention includes a light source emitting a light beam, a first diffraction element diffracting a returned light beam based on the light beam emitted from the light source and a first photodetector detecting the returned light beam diffracted by the first diffraction element. The first diffraction element has two regions in first diagonal positions among four regions divided by first and second dividing lines intersecting each other as first and second regions, and third, fourth, fifth and sixth regions obtained by equally dividing the remaining two regions in second diagonal positions by a third dividing line. The first photodetector has four photodetection parts sectioned by a first section line substantially parallel to the direction in which a condensed spot of the returned light beam diffracted by the first diffraction element is moved by a variation in the wavelength of the light source and a second section line orthogonal to the first section line. Condensed spots by the returned light beam diffracted in the first and second regions of the first diffraction element are formed at positions apart from each other on opposite sides on the first section line with respect to the intersection of the first and second section lines of the first photodetector, condensed spots by the returned light beam diffracted in the third, fourth, fifth and sixth regions of the first diffraction element are formed on the four photodetection parts of the first photodetector or on the first section line.

Herein, the area "on the four photodetection parts or on the first section line" includes areas about in the center of the four photodetection parts, in the vicinity of the first section line in the four photodetection parts and on the first section line.

When the diffraction angle of a returned light beam changes by a variation in the wavelength of the light source, the condensed spots move substantially parallel to the first section line on the first photodetector, while the condensed spots by the returned light beam from the first and second regions of the first diffraction element are formed apart from each other on the first section line with respect to the intersection of first and second section lines, so that the spots do not go beyond the second section line if they move along the first section line.

Therefore, the output signal can be prevented from being changed in each of the photodetection parts by the movement of the condensed spots. As a result, the focus state at the optical recording medium can accurately be detected when the wavelength of the light source changes. Since the outputs of the four photodetection parts at the focal point are equal, which alleviates the adjusting operation.

The first, second, third, fourth, fifth and sixth regions of the first diffraction element may provide each light beam with a spatial variation corresponding to a focus state on an optical recording medium so that the focus state can be detected by operating the outputs of the four photodetection parts in the first photodetector.

In this case, a spatial variation corresponding to the focus state is provided to a returned light beam diffracted in the first and second regions of the first diffraction element, and the light is received at the photodetection parts on both sides of the first section line of the first photodetector, while a spatial variation corresponding to a focus state is provided to a returned light beam diffracted in the third, fourth, fifth and sixth regions, and the light is received at the four photodetection parts of the first photodetector.

Thus, output signals from two photodetection parts at first diagonal positions in the first photodetector and output signals from two photodetection parts in second diagonal positions can be compared to detect the focus state on the optical recording medium.

The returned light beam diffracted in the third, fourth, fifth and sixth regions of the first diffraction element may form condensed spots substantially in the center of the four photodetection parts in the first photodetector.

When the diffraction angle of a returned light beam changes by a variation in the wavelength of the light source, the condensed spots on the first photodetector move substantially parallel to the first section line, while the condensed spots by the returned light beam from the third, fourth, fifth and sixth regions of the first diffraction element are formed substantially in the center of the four photodetection parts in the first photodetector before moving, so that the spots do not go beyond the second section line as they move substantially parallel to the first section line.

Therefore, the output signals from the photodetection parts can further be prevented from being changed by the movement of the condensed spots. As a result, the focus state at the optical recording medium can accurately be detected if the wavelength of the light source changes. Furthermore, since the outputs of the four photodetection parts are equal in the focused state, which alleviates the adjusting operation.

The spatial variation corresponding to the focus state may be astigmatism. In this case, when the focus state in the optical recording medium departs from the focused state, the condensed spot on the first photodetector deforms into a flat shape, and the output signal from each of the photodetection parts of the first photodetector changes. As a result, the total of the output signals of two photodetection parts of the first photodetector at diagonal positions and the total of the output signals of the other two photodetection parts at diagonal positions can be compared to detect the focus state at the optical recording medium.

The first, second, third, fourth, fifth and sixth regions of the first diffraction element are formed to share the intersection of the first, second, and third dividing lines of the first diffraction element as a common origin, the first and second regions of the first diffraction element may have grating patterns set with reference to two points on the first section line apart from each other from the intersection of the first and second section lines of the first photodetector, and the third, fourth, fifth and sixth regions of the first diffraction element may have grating patterns set with reference to the substantial centers of the four photodetection parts of the first photodetector.

In particular, the first and second regions of the first diffraction element may be provided in a direction substantially perpendicular to the direction in which the condensed spot of the returned light beam diffracted by the first diffraction element moves by a variation in the wavelength of the light beam.

There may be provided a second diffraction element provided in an optical path between the light source and the first diffraction element, and splitting a light beam emitted from the light source into a main light beam and first and second sub light beams, a second photodetector having two photodetection parts divided into two by a section line substantially parallel to the first section line of the first photodetector and a third photodetector having two photodetection parts divided into two by a section line substantially parallel to the first section line of the first photodetector. The first diffraction element may diffract a first returned light beam from the optical recording medium based on the main light beam and guide the diffracted light beam into the first photodetector, while the element may diffract second and third returned light beams from the optical recording medium based on the first and second sub light beams and guide the diffracted light beams into the second and third photodetectors. The first returned light beam diffracted in the first and second regions of the first diffraction element may form condensed spots at positions apart from each other on opposite sides on the first section line with respect to the intersection of the first and second section lines of the first photodetector, and the first returned light beam diffracted in the third, fourth, fifth and sixth regions of the first diffraction element may form condensed spots substantially in the center of the four photodetection parts in the first photodetector. The second returned light beam diffracted in the first and second regions of the first diffraction element may form condensed spots on the section line of the second photodetector, and the second returned light beam diffracted in the third, fourth, fifth and sixth regions of the first diffraction element may form condensed spots in the two photodetection parts of the second photodetector. The third returned light beam diffracted in the first and second regions of the first diffraction element may form condensed spots on a section line of the third photodetector, and the third returned light beam diffracted in the third, fourth, fifth and sixth regions of the first diffraction element may form condensed spots in the two photodetection parts of the third photodetector.

In this case, the condensed spots by the first returned light beam diffracted in the first and second regions of the first diffraction element are formed at positions apart from each other on opposite sides on the first section line with respect to the intersection of the first and second section lines of the first photodetector, and the condensed spots by the first returned light beam diffracted in the third, fourth, fifth and sixth regions of the first diffraction element are formed substantially in the center of the four photodetection parts of the first photodetector. The condensed spots by the second and third returned light beams diffracted in the first and second regions of the first diffraction element are formed on section lines of the second and third photodetectors, and the condensed spots by the second and third returned light beams diffracted in the third, fourth, fifth and sixth regions of the first diffraction element are formed in two photodetection parts in the second and third photodetectors, respectively.

When the diffraction angle of the first returned light beam changes by a variation in the wavelength of the light source, the condensed spots by the first returned light beam move substantially parallel to the first section line on the first photodetector, while the condensed spots by the first returned light beam from the first and second regions of the first diffraction element are formed on the first section line apart from each other from the intersection of the first and second section lines before moving, and therefore the spots do not go beyond the second section line if they move along the first section line. The condensed spots by the first returned light beam from the third, fourth, fifth and sixth regions of the first diffraction element are formed substantially in the center of the four photodetection parts before moving, and therefore the spots do not go beyond the second section line if they move substantially parallel to the first section line.

The condensed spots by the second returned light beam from the first and second regions of the first diffraction element move along the section line of the second photodetector, and the condensed spots by the second returned light beams from the third, fourth, fifth and sixth regions of the first diffraction element move substantially parallel to the section line in the two photodetection parts of the second photodetector.

The condensed spots by the third returned light beam from the first and second regions of the first diffraction element move along the section line of the third photodetector and the condensed spots by the third returned light beam from the third, fourth, fifth and sixth regions of the first diffraction element move substantially parallel to the section line in the two photodetection parts in the third photodetector.

Therefore, the output signal of each photodetection part can be prevented from being changed by the movement of the condensed spots. As a result, the focus state and the tracking state at the optical recording medium can accurately be detected if the wavelength of the light source changes.

Meanwhile, the returned light beam diffracted in the third, fourth, fifth and sixth regions of the first diffraction element may form condensed spots apart from each other on opposite sides with respect to the second section line of the first photodetector on the first section line or at the four photodetection parts in the vicinity of the first section line.

When the diffraction angle of the returned light beam changes by a variation in the wavelength of the light source, the condensed spots move substantially parallel to the first section line on the first photodetector, while the condensed spots by the returned light beam from the third, fourth, fifth and sixth regions of the first diffraction element are formed apart from each other from the intersection of the first and second section lines on or in the vicinity of the first section line before moving, and therefore the spots do not go beyond the second section line if they move substantially parallel to the first section line.

Therefore, the output signal of each photodetection part can further be prevented from being changed by the movement of the condensed spots. As a result, the focus state at the optical recording medium can accurately be detected when the wavelength of the light source changes. The outputs of the four photodetection parts are equal at the focused state, which alleviates the adjustment.

A spatial variation corresponding to the focus state may be astigmatism in the first and second regions, while it may be a change in condensed spots on the four photodetection parts of the first photodetector according to the Foucault method in the third, fourth, fifth, and sixth regions.

In this case, when the focus state is departed from the focused state at the optical recording medium, the shape of condensed spots by the returned light beam from the first and second regions of the first diffraction element on the first photodetector is changed into a flat shape, and the output signal of each photodetection part of the first photodetector changes. The shape of the condensed spots by the returned light beam from the third, fourth, fifth and sixth regions of the first diffraction element on the first photodetector changes according to the Foucault method, and the output signal of each photodetection part of the first photodetector changes. Therefore, the total of the output signals at two photodetection parts at first diagonal positions in the first photodetector and the total of the output signals at two photodetection parts at second diagonal positions can be compared to detect the focus state at the optical recording medium.

The first, second, third, fourth, fifth and sixth regions of the diffraction element are formed to share the intersection of the first, second, and third dividing lines of the first diffraction element as a common origin, the first and second regions of the first diffraction element may have grating patterns set with reference to two points on the first section line apart from each other from the intersection of the first and second section lines of the first photodetector. The third, fourth, fifth and sixth regions of the first diffraction element may have grating patterns set so that condensed spots by the returned light beam diffracted in the first and second regions are set apart from each other on opposite sides with respect to the second section line of the first photodetector on the first section line or at the four photodetection parts in the vicinity of the first section line.

The first and second regions of the first diffraction element in particular may be provided in a direction substantially perpendicular to the direction in which the condensed spots of the returned light beam diffracted by the first diffraction element move by a variation in the wavelength of the light source.

There may further be provided a second diffraction element provided in an optical path between the light source and the first diffraction element and splitting a light beam emitted from the light source into a main beam and first and second sub light beams, a second photodetector having two photodetection parts divided into two by a section line substantially parallel to the first section line of the first photodetector and a third photodetector having two photodetection parts divided into two by a section line substantially parallel to the first section line of the first photodetector. The first diffraction element may diffract a first returned light beam from the optical recording medium based on the main light beam and guide the diffracted light beam into the first photodetector, while may diffract second and third returned light beams from the optical recording medium based on the first and second sub light beams and guide the diffracted light beams into the second and third photodetectors, respectively. The first returned light beam diffracted in the first and second regions of the first diffraction element may form condensed spots at positions apart from each other on opposite sides on the first section line with respect to the intersection of the first and second section lines of the first photodetector, and the first returned light beam diffracted in the third, fourth, fifth and sixth regions of the first diffraction element may form condensed spots apart from each other with respect to the second section line of the first photodetector on the first section line or at the four photodetection parts in the vicinity of the first section line. The second returned light beam diffracted in the first and second regions of the first diffraction element may form condensed spots on the section line of the second photodetector and the second returned light beam diffracted in the third, fourth, fifth and sixth regions of the first diffraction element may form condensed spots in the two photodetection parts of the second photodetector. The third returned light beam diffracted in the first and second regions of the diffraction element may form condensed spots on the section line of the third photodetector, and the third returned light beam diffracted in the third, fourth, fifth and sixth regions of the first diffraction element may form condensed spots in the two photodetection parts of the third photodetector.

In this case, the condensed spots by the first returned light beam diffracted in the first and second regions of the first diffraction element are formed at positions apart from each other on opposite sides on the first section line with respect to the intersection of the first and second section lines of the first photodetector, and the condensed spots by the first returned light beam diffracted in the third, fourth, fifth and sixth regions of the first diffraction element are formed on the first section line of the first photodetector or at the four photodetection parts in the vicinity of the first section line. The condensed spots by the second and third returned light beams diffracted in the first and second regions of the first diffraction element are formed on section lines of the second and third photodetectors, respectively and the condensed spots by the second and third returned light beams diffracted in the third, fourth, fifth and sixth regions of the first diffraction element are formed in two photodetection parts in the second and third photodetectors, respectively.

When the diffraction angle of the first returned light beam changes by a variation in the wavelength of the light source, the condensed spots by the first returned light beam move substantially parallel to the first section line on the first photodetector. In this case, the condensed spots by the first returned light beam from the first and second regions of the first diffraction element are formed on the first section line apart from each other from the intersection of the first and second section lines before moving, and therefore the spots do not go beyond the second section line if they move along the first section line. The condensed spots formed by the first returned light beam from the third, fourth, fifth and sixth regions of the first diffraction element do not go beyond the second section line if they move substantially parallel to the first section line because the condensed spots by the returned light beam diffracted in the first and second regions are formed before moving on the first section line of the first photodetector or at the four photodetection parts in the vicinity of the first section line.

The condensed spots by the second returned light beam from the first and second regions of the first diffraction element move along the section line of the second photodetector, while the condensed spots by the second returned light beam from the third, fourth, fifth and sixth regions of the first diffraction element move substantially parallel to the section line in the two photodetection parts of the second photodetector.

Furthermore, the condensed spots by the third returned light beam from the first and second regions of the first diffraction element move along the section line in the third photodetector, and the condensed spots by the third returned light beam from the third, fourth, fifth and sixth regions of the first diffraction element move substantially parallel to the section line in the two photodetection parts of the third photodetector.

Therefore, the output signal of each photodetection part can be prevented from being changed by the movement of the condensed spots. As a result, the focus sate and tracking state at the optical recording medium can accurately be detected when the wavelength of the light source changes. In this case, the area of the returned light beam coming into the first and second regions of the first diffraction element is larger than the area of the returned light beam coming into the third, fourth, fifth and sixth regions. Therefore, the light intensity of the condensed spots formed on the first section line of the first photodetector is higher than the light intensity of the condensed spots formed at the four photodetection parts of the first photodetector.

Therefore, when the condensed spots on the first photodetector move along the first section line by a variation in the wavelength of the light source, the change in the output signal of each photodetection part of the first photodetector is reduced. As a result, the focus state at the optical recording medium can be even more accurately detected when the wavelength of the light source changes.

Astigmatism may be provided at an angle of about 45° with respect to the first and second section lines of the first photodetector. In this case, when the focus state at the optical recording medium is departed from the focused state, the shape of the condensed spot on the first photodetector is in an elliptical shape having its major axis forming an angle of about 45° with respect to the first and second section lines.

The first and second dividing lines of the first diffraction element may form an angle of about 45° with respect to the first and second section lines of the first photodetector, while the third dividing line of the first diffraction element may be substantially parallel to the first section line of the first photodetector.

The light source emits a light beam having an elliptical far-filed pattern, a returned light beam forms an elliptical light spot at the first diffraction element. The positional relation between the light source and the first diffraction element may be set so that the minor axis of the light spot in the elliptical shape extends substantially parallel to the third dividing line of the first diffraction element, and that the major axis extends in the first and second regions of the first diffraction element.

An optical recording medium drive according to another aspect of the present invention includes a rotation driving mechanism rotating an optical recording medium, an optical pickup apparatus irradiating the optical recording medium with a light beam, a pickup driving mechanism moving the optical pickup apparatus in the radial direction of the optical recording medium and a signal processing part processing an output signal from the optical pickup apparatus. The optical pickup apparatus further includes a light source emitting a light beam, a first diffraction element diffracting a returned light beam based on the light beam emitted from the light source and a first photodetector detecting a returned light beam diffracted by the first diffraction element. The first diffraction element has two regions in first diagonal positions among four regions divided by first and second dividing lines intersecting each other as first and second regions, and third, fourth, fifth and sixth regions obtained by equally dividing the remaining two regions in second diagonal positions by a third dividing line. The first photodetector has four photodetection parts divided by a first section line substantially parallel to the direction in which condensed spots of a returned light beam diffracted by the first diffraction element move by a variation in the wavelength of the light source and a second section line orthogonal to the first section line. The condensed spots by the returned light beam diffracted in the first and second regions of the first diffraction element are formed at positions apart from each other on opposite sides on the first section line with respect to the intersection of the first and second section lines of the first photodetector, and the condensed spots by the returned light beam diffracted in the third, fourth, fifth and sixth regions of the first diffraction element are formed on the four photodetection parts of the first photodetector or on the first section line.

In the optical recording medium drive, the use of the above-described optical pickup apparatus allows the focus state at the optical recording medium to be accurately detected when the wavelength of the light source changes.

The first, second, third, fourth, fifth and sixth regions of the first diffraction element may provide each light beam with a spatial variation corresponding to a focus state on the optical recording medium so that the focus state can be detected by operating the outputs of the four photodetection parts in the first photodetector.

In this case, the returned light beam diffracted in the first and second regions of the first diffraction element is provided with a spatial variation corresponding to the focus state, and received at the photodetection parts on both sides of the first section line of the first photodetector, while the returned light beam diffracted in the third, fourth, fifth and sixth regions is provided with a spatial variation corresponding to the focus state, and received at the four photodetection parts of the first photodetector.

Thus, the output signals of the two photodetection parts in first diagonal positions in the first photodetector and the output signals of the two photodetection parts in second diagonal positions can be compared to detect the focus state at the optical recording medium.

The returned light beam diffracted in the third, fourth, fifth and sixth regions of the first diffraction element may form condensed spots substantially in the center of the four photodetection parts of the first photodetector.

Meanwhile, the returned light beam diffracted in the third, fourth, fifth and sixth regions of the first diffraction element may form condensed spots apart from each other on opposite sides with respect to the second section line of the first photodetector on the first section line or at the four photodetection parts in the vicinity of the first section line.

A holographic optical element according to a still further aspect of the present invention includes a diffraction surface diffracting an incident light beam and forming a condensed spot of the diffracted light beam on a virtual surface. The diffraction surface has two regions in first diagonal positions among four regions divided by first and second dividing lines intersecting each other as first and second regions, and third, fourth, fifth and sixth regions obtained by equally dividing the remaining two regions in second diagonal positions by a third dividing line. The first and second dividing lines form an angle of about 45° with respect to the intersecting line between a plane including the optical axis of the incident light beam and the optical axis of the diffracted light beam and the diffraction surface. The third dividing line is substantially parallel to the intersecting line between the plane including the optical axis of the incident light beam and the optical axis of the diffracted light beam and the diffraction surface.

When the holographic optical element is used as a diffraction element in the optical pickup apparatus, the output signal of each photodetection part can be prevented from being changed by the movement of the condensed spots. Therefore, the focus state at the optical recording medium can accurately be detected when the wavelength of the light source changes.

The first, second, third, fourth, fifth and sixth regions of the first diffraction element may provide each light beam with a spatial variation corresponding to a focus state on an optical recording medium so that the focus state can be detected by operating the outputs of the four photodetection parts in a photodetector.

BRIEF DESCRIPTION OF THE DRAWINGS

FIG. 21 is schematic plan views showing a condensed state on a photodetector in the optical pickup apparatus in FIG. 20;

DESCRIPTION OF THE PREFERRED EMBODIMENTS (1) First Embodiment

Figure 1:
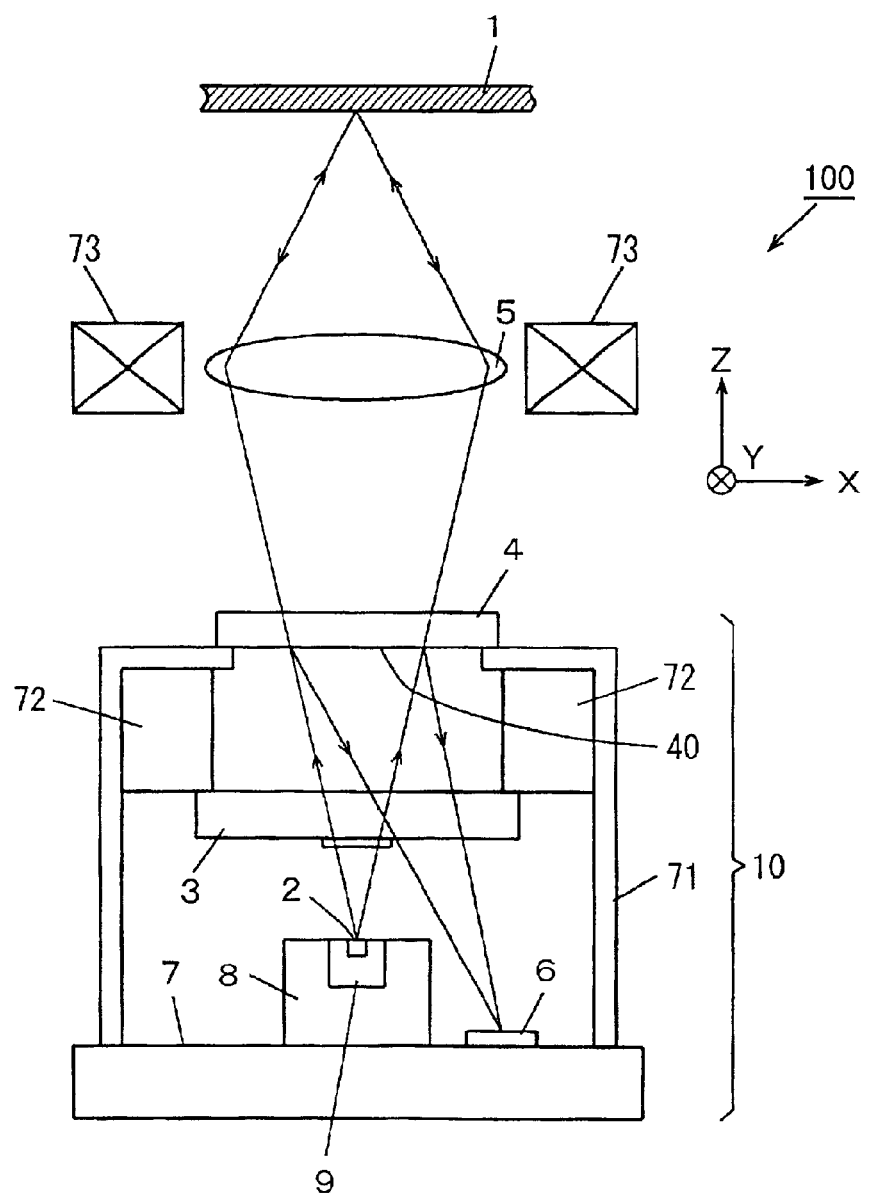
FIG. 1 is a schematic view of an optical pickup apparatus according to a first or second embodiment of the present invention.

FIG. 1 is a schematic view of an optical pickup apparatus according to a first embodiment of the present invention. The optical pickup apparatus 100 shown in FIG. 1 performs focus servo control according to the astigmatism method and tracking servo control according to the differential push-pull method.

In FIG. 1, the radial direction of a reflection type optical disk 1 such as a CD-R is the X-direction, the track direction of the optical disk 1 is the Y-direction, and the direction perpendicular to the disk surface of the optical disk 1 is the Z-direction.

The optical pickup apparatus 100 includes a light projecting/photoreceiving unit 10 and an objective lens 5. The light projecting/photoreceiving unit 10 includes a semiconductor laser device 2, a transmission-type diffraction grating 3, a transmission-type holographic optical element 4 and a photodetector 6.

A block 8 is provided on a stem (pedestal) 7, and a heat sink 9 is attached to a side surface of the block 8. The semiconductor laser device 2 is provided at a front surface end of the heat sink 9. The diffraction grating 3 is made of a material such as optical glass or optical resin, and provided in a holder 71 through a spacer 72. The transmission-type holographic optical element 4 is provided at an opening part on a top surface of the holder 71.

The semiconductor laser device 2 emits a laser beam (light beam) in the Z-direction. The diffraction grating 3 splits the light beam emitted from the semiconductor laser device 2 into three light beams, i.e., a 0th order diffracted light beam (main beam), a +1st order diffracted light beam (sub beam) and a −1st order diffracted light beam (sub beam) in a plane substantially including the Y- and Z-directions. These light beams are transmitted through the transmission-type holographic optical element 4. Note that in the figures, the three light beams are generically represented by a single light beam.

The objective lens 5 is supported by an actuator 73 movably in the radial direction (X-direction) of the optical disk 1 for tracking servo control, and in the vertical direction (Z-direction) for focus servo control. The objective lens 5 condenses the main beam and the two sub beams diffracted and transmitted in the 0th order through the transmission-type holographic optical element 4 as a main spot M0 and sub spots S1 and S2 on both sides thereof on the optical disk 1.

The transmission-type holographic optical element 4 has a six-segment holographic surface 40, splits three returned light beams (reflected light beams) from the optical disk 1 into six beams, diffracts these beams in the first order within a plane substantially including the X- and Z-directions and allows them to come into the photodetector 6. At the time, the transmission-type holographic optical element 4 provides the three returned light beams from the optical disk 1 with astigmatism.

According to this embodiment, the optical disk 1 corresponds to the optical recording medium, and the semiconductor laser device 2 corresponds to the light source, the transmission-type holographic optical element 4 corresponds to the first diffraction element and the diffraction grating 3 corresponds to the second diffraction element. A four-segment photodetection part 60 corresponds to the first photodetector, a two-segment photodetection part 61 corresponds to the second photodetector, and a two-segment photodetection part 62 corresponds to the third photodetector.

Figure 2:
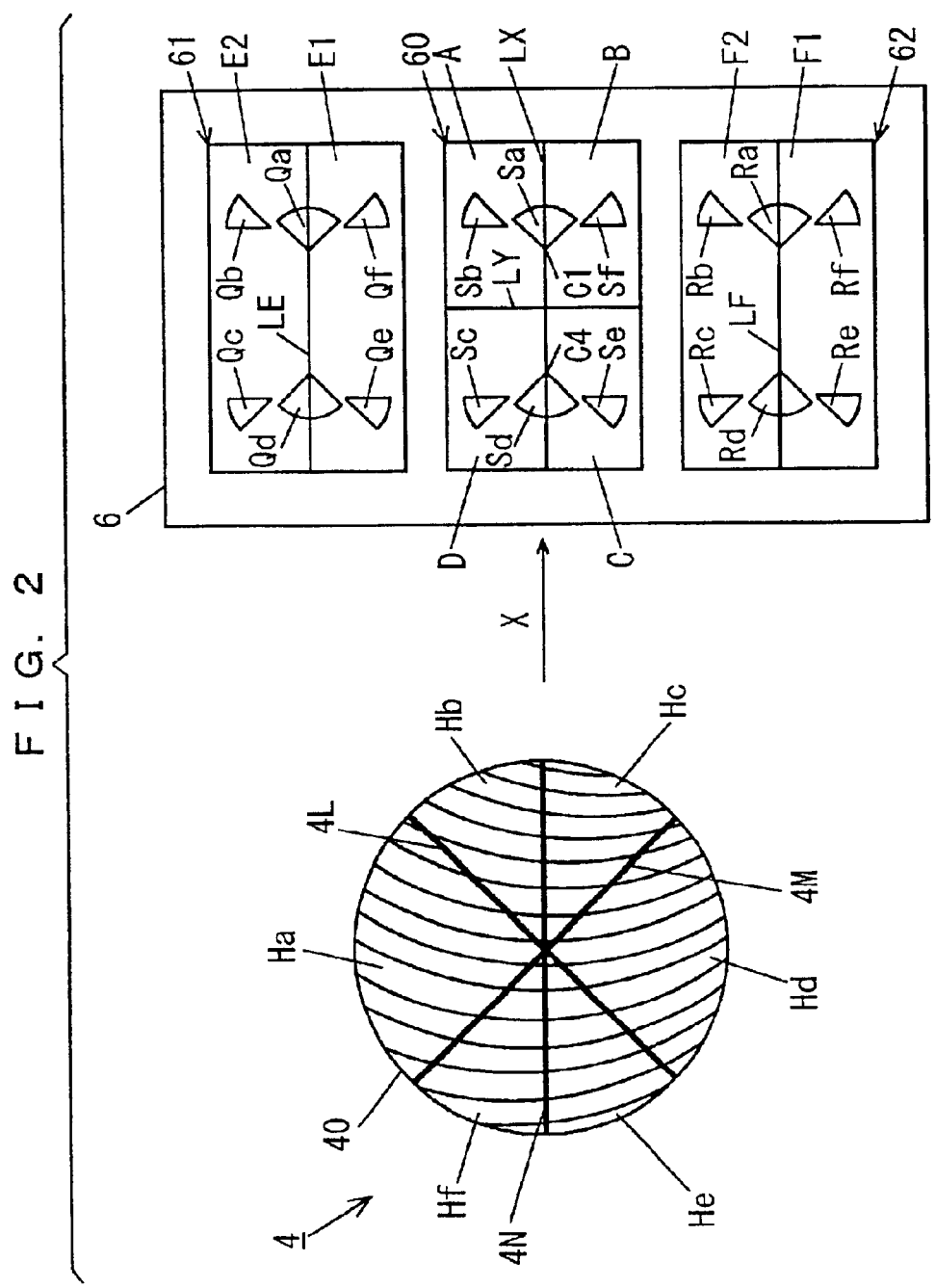
FIG. 2 is a schematic plan view of a transmission-type holographic optical element and a photodetector used according to the first embodiment.

FIG. 2 is a schematic plan view of the transmission type holographic optical element 4 and the photodetector 6 used according to the first embodiment.

The six-segment holographic surface 40 of the transmission-type holographic optical element 4 is divided into six regions Ha, Hb, Hc, Hd, He and Hf by virtual dividing lines 4L, 4M and 4N. The dividing lines 4L and 4M are orthogonal to each other, and form an angle of about 45° with respect to the radial direction (X-direction) of the optical disk 1. The dividing line 4N is parallel to the radial direction (X-direction) of the optical disk 1. Thus, the opposing two regions, Ha and Hb are equal in area. The opposing four regions, Hb, Hc, He and Hf are equal in area.

The photodetector 6 includes a four-segment photodetection part 60 provided in the central part for focus servo control according to the astigmatism method, and two-segment photodetection parts 61 and 62 provided on both sides of the four-segment photodetection part 60 for tracking servo control according to the differential push-pull method.

The four-segment photodetection part 60 is divided by section lines LX and LY orthogonal to each other into four photodetection parts A, B, C and D which are equal in area. The section line LX is provided substantially parallel to the radial direction (X-direction) of the optical disk 1, while the section line LY is provided substantially parallel to the track direction (Y-direction) of the optical disk 1.

The two-segment photodetection part 61 is divided by a section line LE into two photodetection parts E1 and E2 which are equal in area. The section line LE is provided substantially parallel to the radial direction (X-direction) of the optical disk 1.

The two-segment photodetection part 62 is divided by a section line LF into two photodetection parts F1 and F2 which are equal in area. The section line LF is provided substantially parallel to the radial direction (X-direction) of the optical disk 1.

Figure 3:
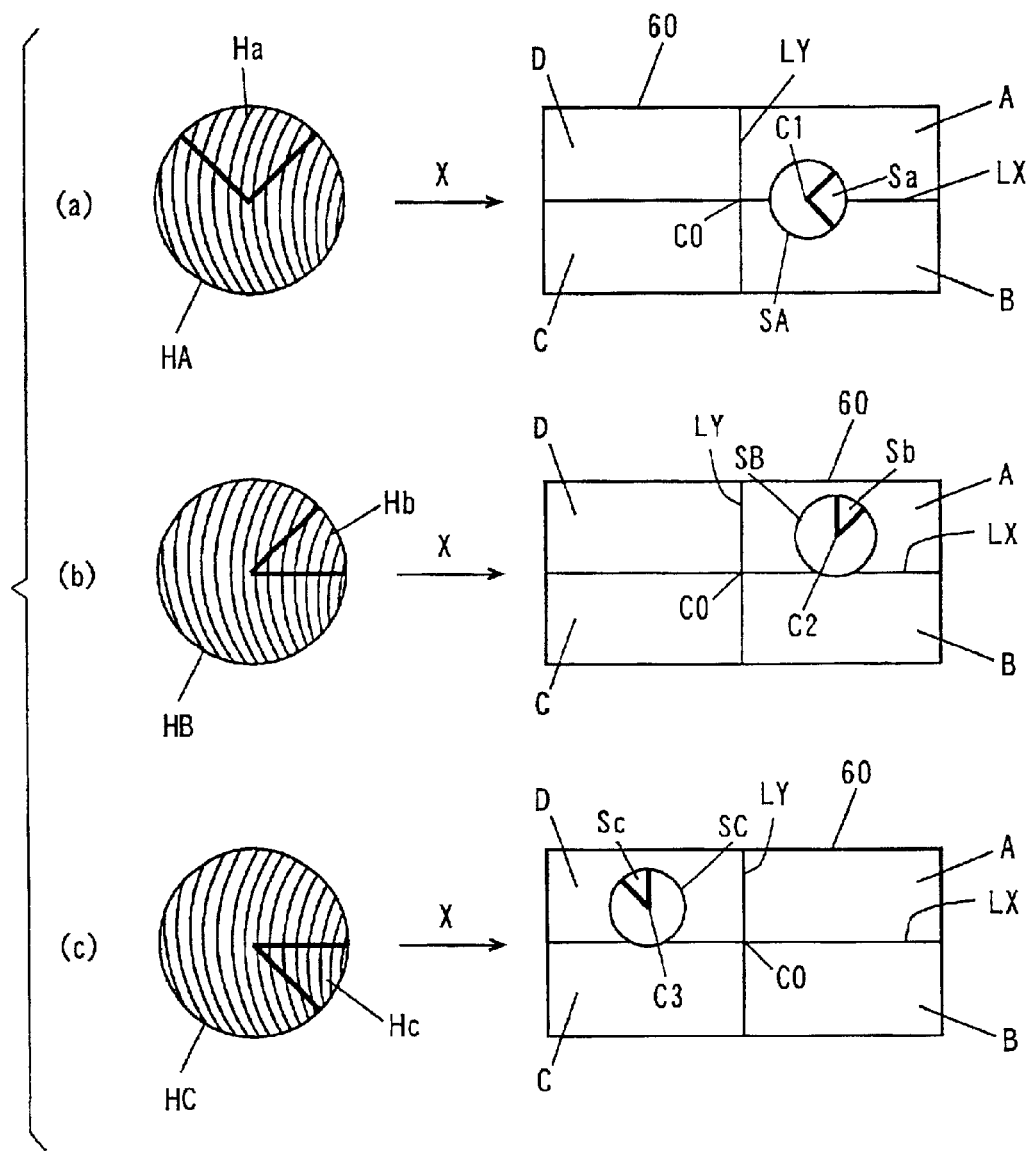
FIG. 3 is schematic views for use in illustration of a method of designing a holographic pattern of a six-segment holographic surface according to the first embodiment.
Figure 4:
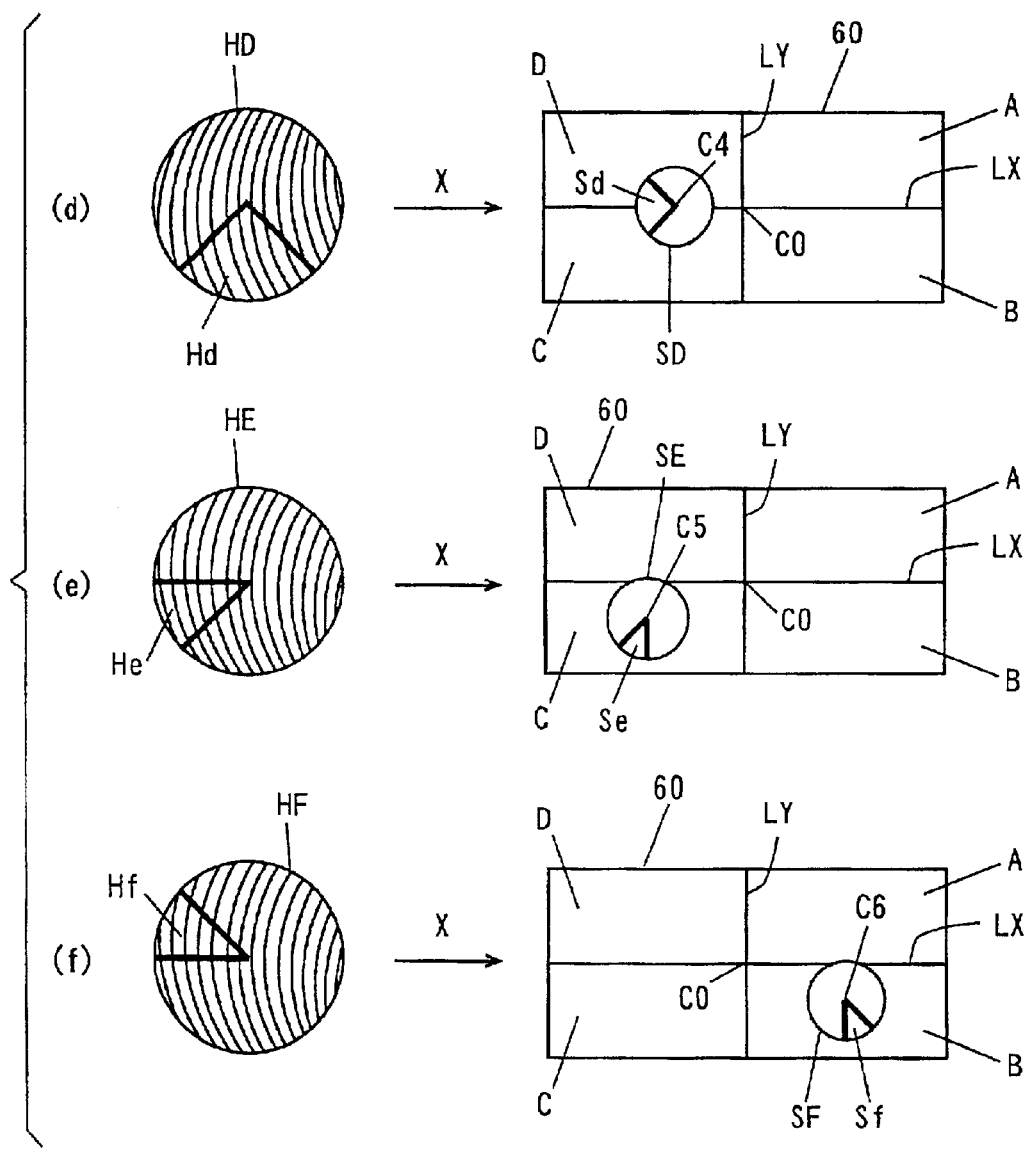
FIG. 4 is schematic views for use in illustration of a method of designing a holographic pattern of a six-segment holographic surface according to the first embodiment.

FIG. 3 and FIG. 4 are schematic views showing a method of designing the holographic pattern of the six-segment holographic surface 40 of the transmission-type holographic optical element 4 according to the first embodiment. Herein, the case with astigmatism will be described, according to which a light beam coming into the transmission-type holographic optical element 4 forms spots on the photodetector 6 in shapes inverted with respect to the dividing line 4L as an axis of symmetry. As shown in FIGS. 3(a) and 4(d), the holographic patterns of two regions Ha and Hd in the transmission-type holographic optical element 4 are designed with reference to points C1 and C4, respectively on the section line LX of the four-segment photodetection part 60. The points C1 and C4 are positioned a prescribed distance apart from the central point C0 each other.

As shown in FIG. 3(a), the region Ha is designed by producing only the region Ha corresponding to a condensed spot Sa on the four-segment photodetection part 60 in the holographic pattern HA forming the condensed spot SA centered at the point C1 on the section line LX in the four-segment photodetector 60. As shown in FIG. 4(d), the region Hd is designed by producing only the part corresponding to a condensed spot Sd on the four-segment photodetection part 60 in the holographic pattern HD forming the condensed spot SD centered at the point C4 on the section line LX of the four-segment photodetection part 60.

As shown in FIGS. 3(b) and (c) and FIGS. 4(e) and (f), the holographic patterns of the four regions Hb, Hc, He and Hf in the transmission-type holographic optical element 4 are designed with reference to points C2, C3, C5 and C6 which are substantially in the center of the photodetection parts A, D, C and B in the four-segment photodetection part 60, respectively.

As shown in FIG. 3(b), the region Hb is designed by producing only the part corresponding to a condensed spot Sb on the photodetection part B in the holographic pattern HB forming a condensed spot SB centered at the point C2 on the photodetection part A.

As shown in FIG. 3(c), the region Hc is designed by producing only the part corresponding to a condensed spot Sc on the photodetection part C in a holographic pattern HC forming a condensed spot SC centered at the point C3 on the photodetection part D.

As shown in FIG. 4(e), the region He is designed by producing only the part corresponding to a condensed spot Se on the photodetection part D in a holographic pattern HE forming a condensed spot SE centered at the point C5 on the photodetection part C.

As shown in FIG. 4(f), the region Hf is designed by producing only the part corresponding to a condensed spot Sf on the photodetection part A in a holographic pattern HF forming a condensed spot SF centered at the point C6 on the photodetection part B.

The origin in producing the holographic patterns of the six regions Ha, Hb, Hc, Hd, He and Hf is in common the intersection of the dividing lines 4L, 4M and 4N (the center of the circle).

As shown in FIG. 2, the main light beam diffracted in the regions Ha and Hd in the six-segment holographic surface 40 is condensed as spots Sa and Sd, respectively at positions opposite to each other with reference to the points C1 and C4 on the section line LX in the four-segment photodetection part 60. Meanwhile, the main light beam diffracted in the regions Hb, Hc, He and Hf in the six-segment holographic surface 40 is condensed as spots Sb, Sc, Se and Sf, respectively substantially in the center of the photodetection parts A, D, C and B of the four-segment photodetection part 60.

One sub light beam diffracted in the regions Ha and Hd in six-segment holographic surface 40 is condensed as light spots Qa and Qd on the section line LE in the two-segment photodetection part 61. One sub light beam diffracted in the regions Hb and Hc in the six-segment holographic surface 40 is condensed as light spots Qb and Qc on the photodetector part E2, and one sub light beam diffracted in the regions He and Hf is condensed as spots Qe and Qf on the photodetection part E1.

The other sub light beam diffracted in the regions Ha and Hd in the six-segment holographic surface 40 is condensed as spots Ra and Rd on the section line LF in the two-segment photodetection part 62. One sub light beam diffracted in the regions Hb and Hc in the six-segment holographic surface 40 is condensed as spots Rb and Rc on the photodetection part F2, and one sub light beam diffracted in the regions He and Hf is condensed as spots Re and Rf on the photodetection part F1.

Thus, the condensed spot is divided into six spots, and two condensed spots Sa and Sd are positioned shifted from each other in opposite directions. Note that the points C1 and C4 are set at positions apart from the central point C0 such that the condensed spots Sa and Sd do not go beyond the section line LY by a variation in the lasing wavelength of the semiconductor laser device 2.

Figure 5:
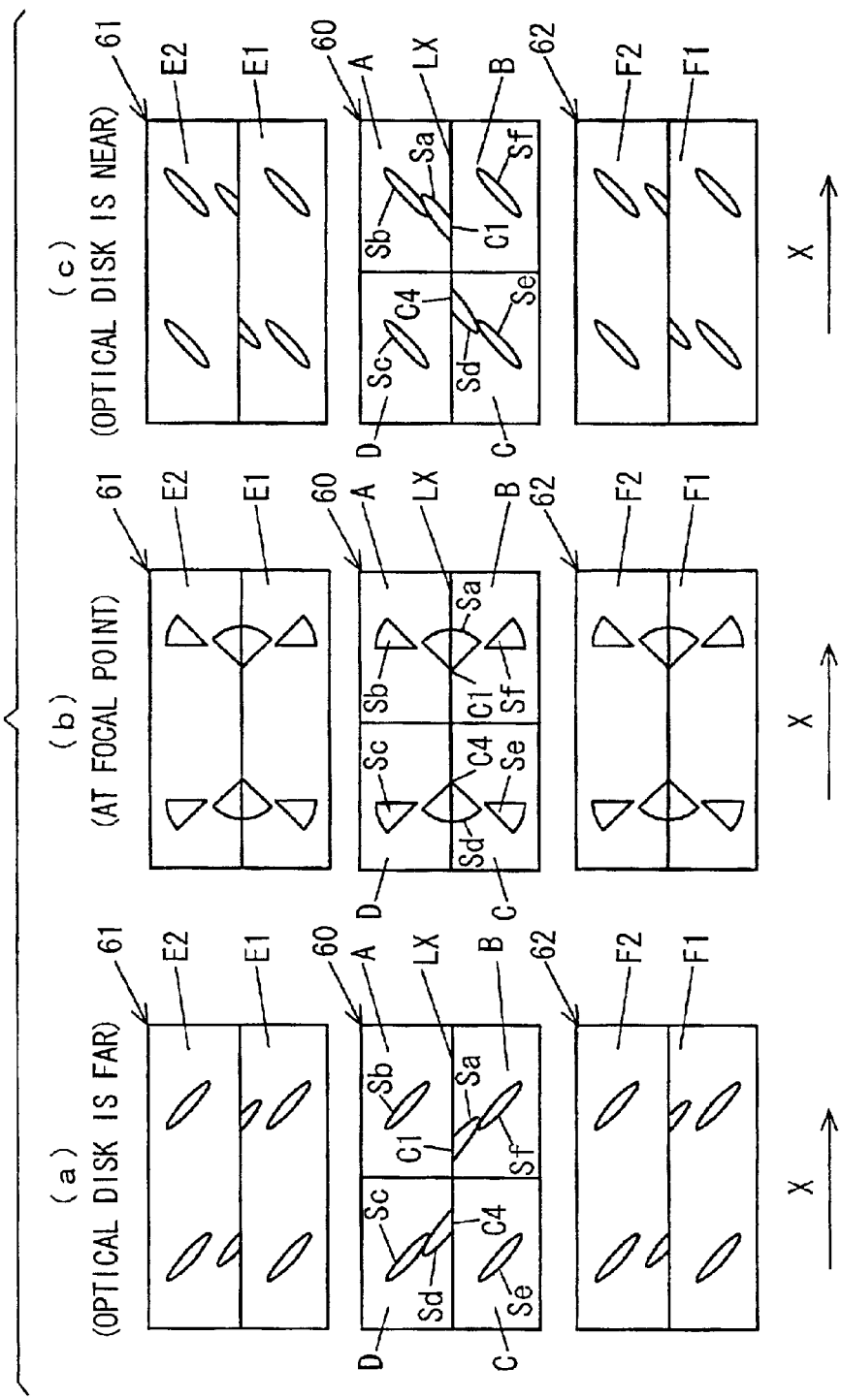
FIG. 5 is schematic plan views showing a condensed state on the photodetector according to the first embodiment.

FIG. 5 is schematic plan views of the condensed state of the main light beam and the sub light beams on the photodetector according to the first embodiment.

When a focus error state is attained as the optical disk 1 is far from the objective lens 5, as shown in FIG. 5(a), the condensed spot Sa is in a shape elongated from the point C1 on the section line LX into the photodetection part B, the condensed spot Sd is in a shape elongated from the point C4 on the section line LX into the photodetection part D, and the condensed spots Sb, Sc, Se and Sf are in a shape elongated into the photodetection parts A, D, C and B, respectively.

When the main light beam attains a focused state on the optical disk 1 (at the focal point), as shown in FIG. 5(b), the condensed spot Sa is formed into a quarter circle centered at the point C1 on the section line LX and lying over the photodetection parts A and B, the condensed spot Sd is formed into a quarter circle centered at the point C4 on the section line LX and lying over the photodetection parts C and D, and the condensed spots Sb, Sc, Se and Sf are formed into a ⅛ circle within the photodetection parts A, D, C and B, respectively.

Furthermore, when a focus error state is attained as the optical disk 1 is near to the objective lens 5, as shown in FIG. 5(c), the condensed spot Sa is in a shape elongated from the point C1 on the section line LX into the photodetection part A, the condensed spot Sd is in a shape elongated from the point C2 on the section line LX into the photodetection part C and the condensed spots Sb, Sc, Se and Sf are in a shape elongated into photodetection parts A, D, C and B, respectively.

Figure 16:
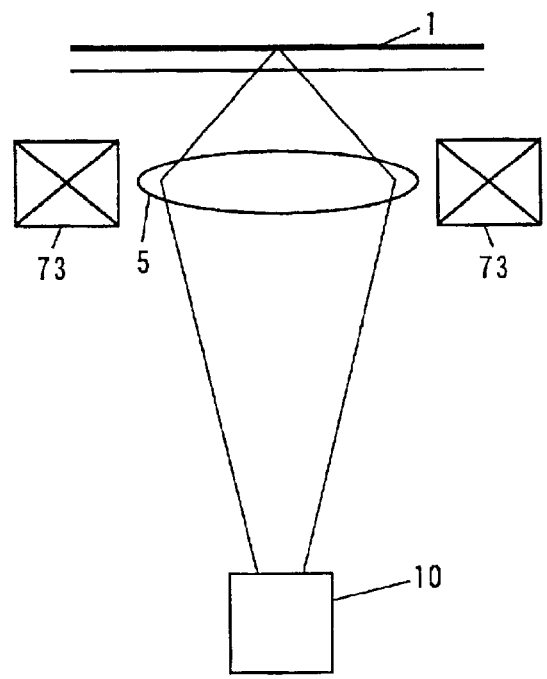
FIG. 16 is a view showing a first arrangement example of a holographic unit in the optical pickup apparatus shown in FIG. 1.

Thus, the condensed spots Sb, Sc, Se and Sf change entirely in the same manner as when the conventional holographic surface 510 shown in FIG. 16 is used, and the condensed spot Sa changes in appearance as if it moves between the photodetection parts A and B, while the light spot Sd changes in appearance as if it moves between the photodetection parts C and D.

Therefore, using output signals PA, PB, PC and PD from the photodetection parts A, B, C and D in the four-segment photodetection part 60, the focus error signal FES can be obtained from the following expression:

$$FES = (PA+PC) - (PB+PD) \tag{1}$$

The focus error signal FES represented by the above expression has a positive value when the optical disk 1 is too near, zero in a good focused state, and a negative value when the optical disk 1 is too far. Thus, the direction of the shift from the focal point position of the optical disk 1 can be determined based on the sign of the focus error signal FES.

The focus error signal FES is fed back to the actuator 73, and the objective lens 5 is moved in the direction perpendicular to the optical disk 1, so that the condensed state on the optical disk 1 can be corrected.

In this case, the condensed spots Sa and Sd by the main light beam from the regions Ha and Hd in the six-segment holographic surface 40 greatly contribute to the focus error signal FES.

Using the output signals PA, PB, PC and PD from the photodetection parts A, B, C and D and the output signals PE1, PE2, PF1 and PF2 from the photodetection parts E1, E2, F1 and F2, the tracking error signal TES according to the differential push-pull method can be obtained from the following expression:

$$TES=(PA+PD)-(PB+PC)-k\{(PE1+PF1)\}-(PE2+PF2)\} \quad (3)$$

wherein k is a coefficient set so that the tracking error offset is initially zero. Thus, according to the differential push-pull method, the tracking error offset can be compensated.

Figure 6:
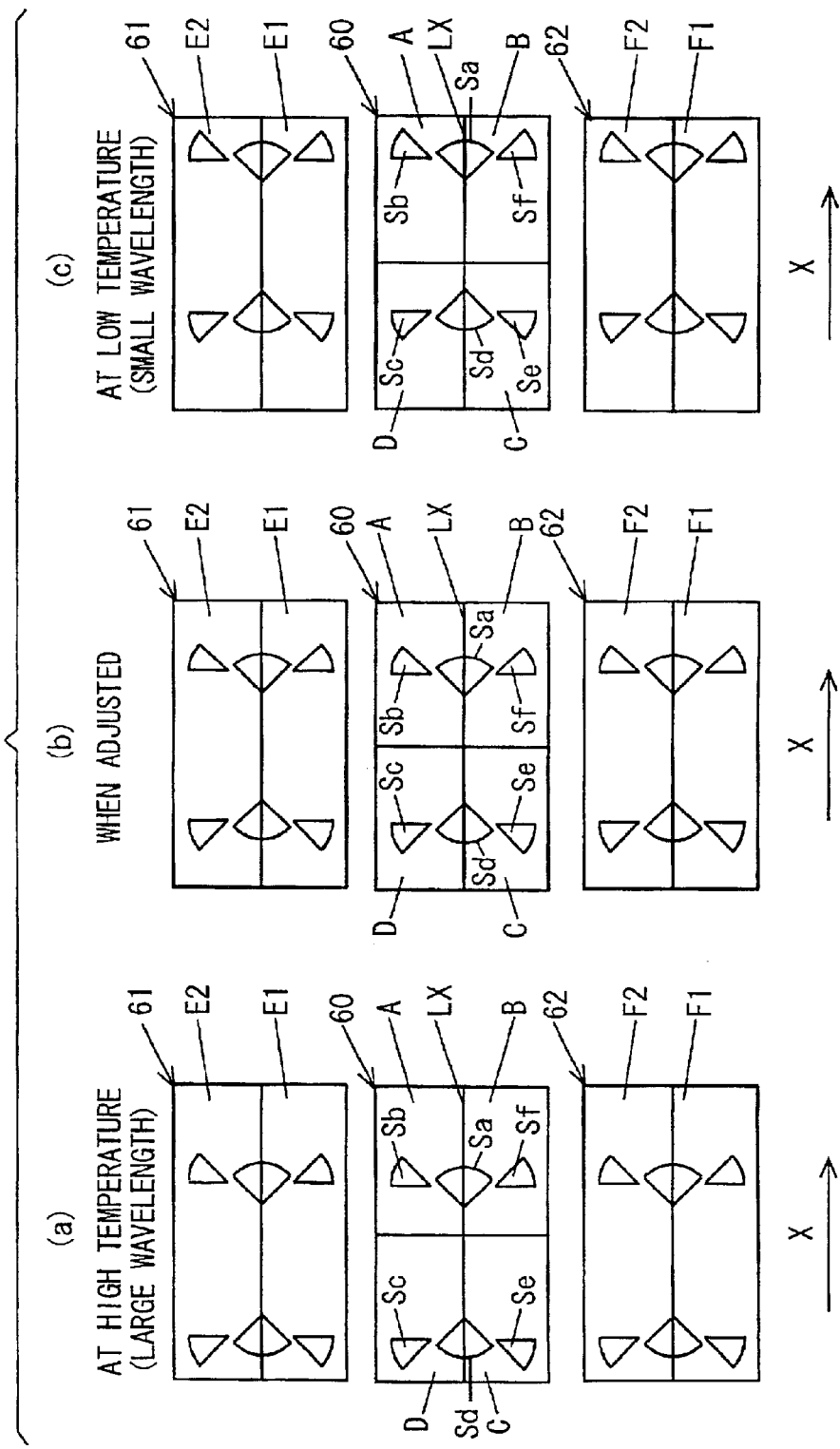
FIG. 6 is schematic plan views showing the movement of condensed spots on a photodetector caused by a variation in the lasing wavelength of a semiconductor laser device.

FIG. 6(a) shows a condensed spot when a lasing wavelength is increased at a higher ambient temperature, FIG. 6(b) shows a condensed spot at the time of adjustment, and FIG. 6(c) shows a condensed spot when the lasing wavelength is smaller at a lower ambient temperature.

At the time of adjustment, as shown in FIG. 6(b), the condensed spots Sa and Sd are positioned in the middle between the photodetection parts A and B, and between the photodetection parts C and D, respectively. The condensed spots Sb, Sc, Se and Sf are positioned in the central part of the photodetection parts A, D, C and D, respectively.

As the lasing wavelength of the semiconductor laser device 2 changes depending upon the ambient temperature, the diffraction angle of the returned light beam at the transmission-type holographic optical element 4 changes. Thus, the condensed spots Sa, Sb, Sc, Sd, Se and Sf move in the X-direction parallel to the section line LX on the four-segment photodetection part 60.

When the lasing wavelength of the semiconductor laser device 2 increases at a higher ambient temperature, as shown in FIG. 6(a), the condensed spots Sa, Sb, Sc, Sd, Se and Sf move toward the left side of the four-segment photodetection part 60.

When the lasing wavelength of the semiconductor laser device 2 decreases at a lower ambient temperature, as shown in FIG. 6(c), the condensed spots Sa, Sb, Sc, Sd, Se and Sf move toward the right side of the four-segment photodetection part 60.

At the time, the condensed spot Sa moves within the range of the photodetection parts A and B along the section line LX, the condensed spot Sd moves within the range of the photodetection parts C and D along the section line LX, and therefore the output signals PA, PB, PC and PD are unaffected. Meanwhile, the condensed spots Sb, Sc, Se and Sf move within the range of the photodetection parts A, D, C and B, respectively and therefore the output signals PA, PD, PC and PB are unaffected.

(2) Second Embodiment

An optical pickup apparatus according to a second embodiment of the present invention will be now described. The general structure of the optical pickup apparatus according to the second embodiment is the same as that shown in FIG. 1.

Figure 7:
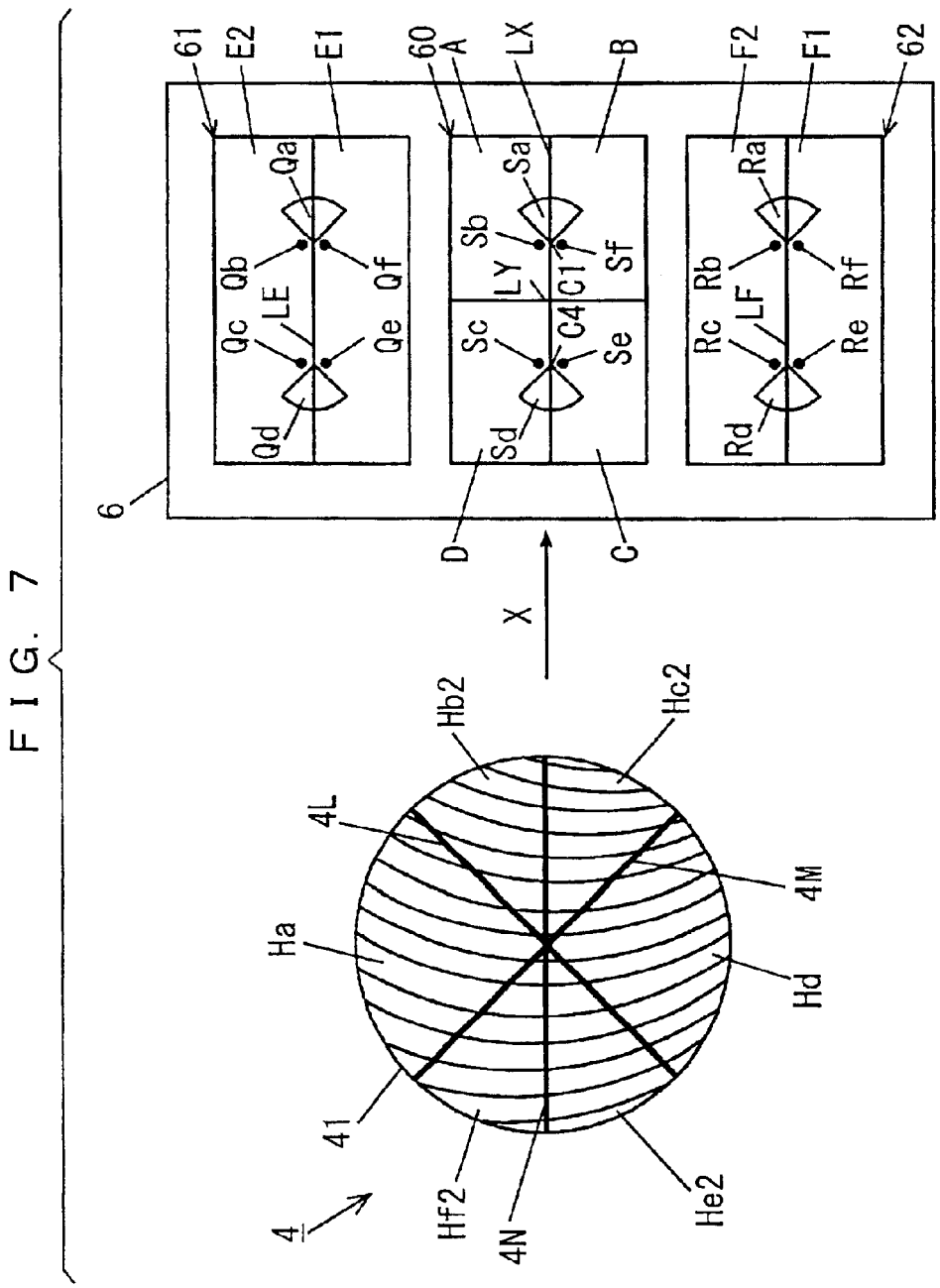
FIG. 7 is a schematic plan view of a transmission-type holographic optical element and a photodetector used according to the second embodiment.

FIG. 7 is a plan view of a transmission-type holographic optical element 4 and a photodetector 6 used in the optical pickup apparatus according to the second embodiment. The structure of the photodetector 6 is the same as that of the photodetector 6 in FIG. 2.

The transmission-type holographic optical element 4 in FIG. 7 is different from the transmission-type holographic optical element 4 in FIG. 2 in that a six-segment holographic surface 41 is used. In the six-segment holographic surface 41, holographic patterns are produced so that astigmatism is generated in the same direction only in two regions Ha and Hd in the transmission-type holographic optical element 4, no astigmatism is generated in the remaining four regions Hb2, Hc2, He2, and Hf2, and focal points result on the photodetector 6.

Figure 8:
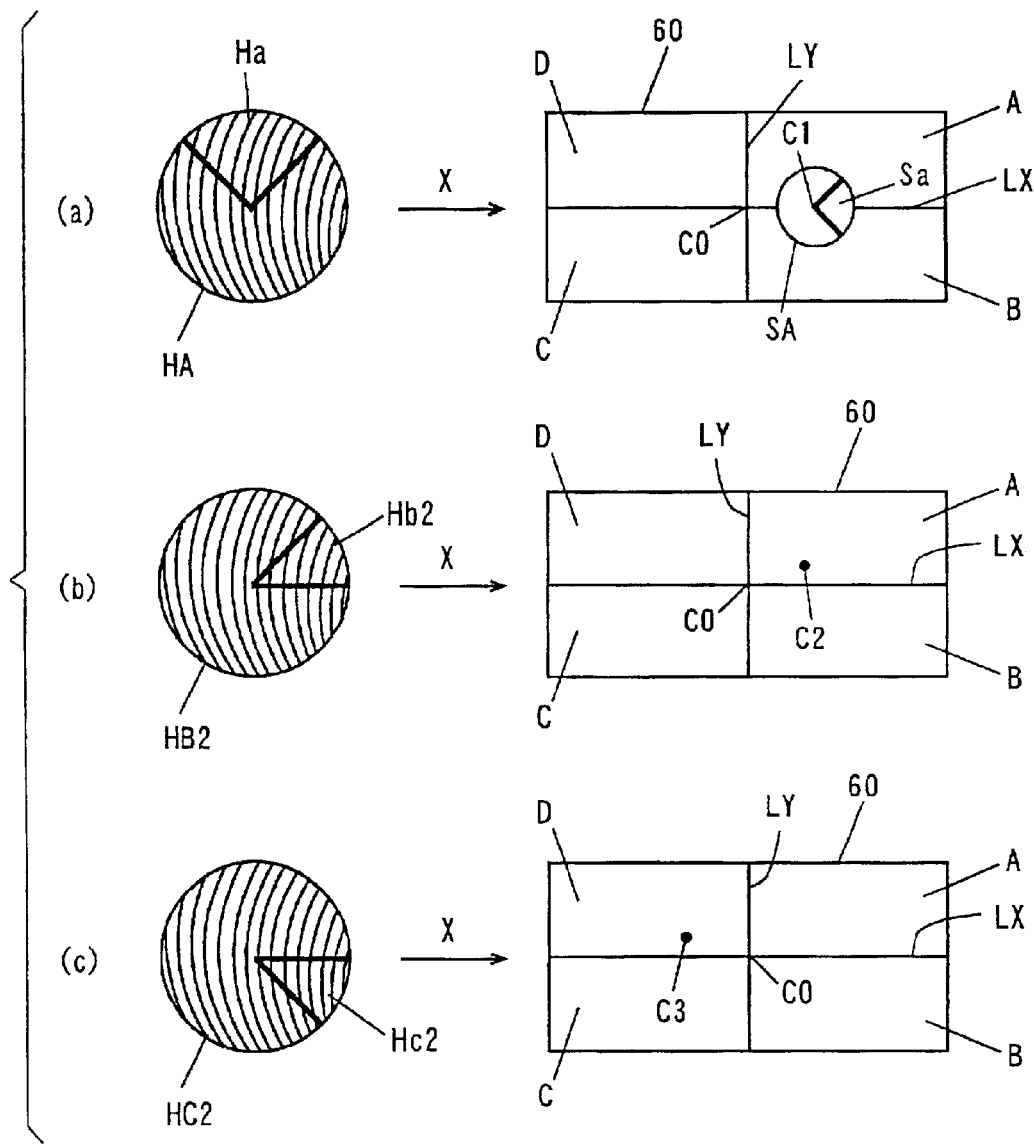
FIG. 8 is schematic views for use in illustration of a method of designing a holographic pattern of a six-segment holographic surface according to the second embodiment.
Figure 9:
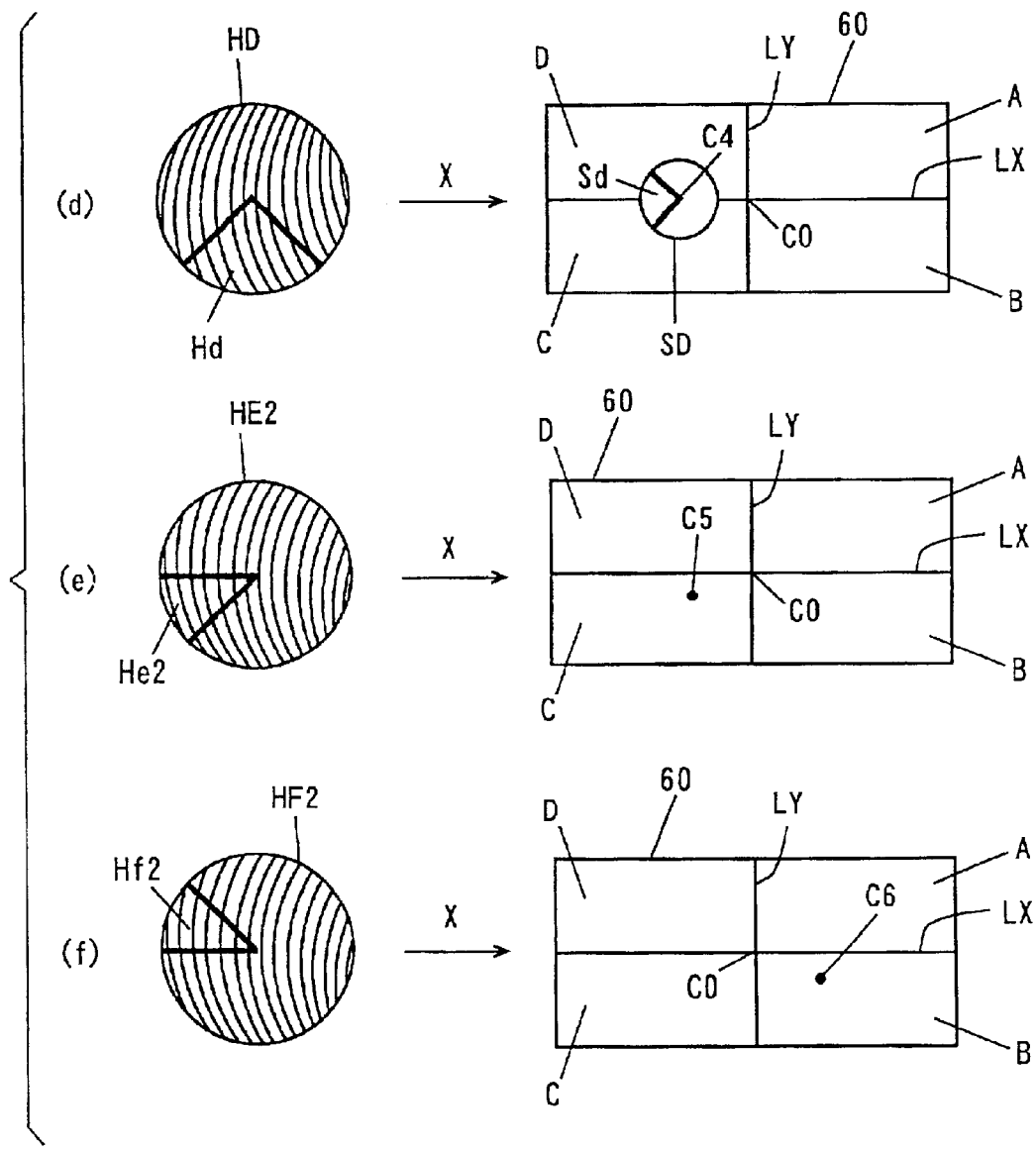
FIG. 9 is schematic views for use in illustration of a method of designing a holographic pattern of a six-segment holographic surface according to the second embodiment.

FIG. 8 and FIG. 9 are views showing a method of designing the six-segment holographic surface 41 in the transmission-type holographic element 4 according to the second embodiment. Herein, the case with astigmatism will be described, according to which a light beam coming into the transmission-type holographic optical element 4 forms spots in inverted shapes with respect to the dividing line 4L as an axis of symmetry on the photodetector 6. As shown in FIGS. 8(a) and 9(d), the method of designing the holographic patterns of the two regions Ha and Hd in the transmission-type holographic optical element 4 is the same as the method of designing those for the two regions Ha and Hd as shown in FIGS. 3(a) and 4(d).

As shown in FIGS. 8(b) and (c) and FIGS. 9(e) and (f), the holographic patterns of four regions Hb2, Hc2, He2 and Hf2 in the transmission-type holographic optical element 4 are designed with reference to the points C2, C3, C5 and C6 near to the point C1 or C4 on the section line LX in FIG. 8(a) in the photodetection parts A, D, C and B in the four-segment photodetection part 60.

The region Hb2 is designed by producing only a part corresponding to one eighth of the holographic pattern HB2 focused at the point C2 as a point on the photodetection part A as shown in FIG. 8(b).

The region Hc2 is designed by producing only a part corresponding to one eighth of the holographic pattern HC2 focused at the point C3 as a point on the photodetection part D as shown in FIG. 8(c).

The region He2 is designed by producing only a part corresponding to one eighth of the holographic pattern HE2 focused at the point C5 as a point on the photodetection part C as shown in FIG. 9(e).

The region Hf2 is designed by producing only a part corresponding to one eighth of the holographic pattern HF2 condensed at a focal point at the point C6 as a point on the photodetection part B as shown in FIG. 9(f).

The origin in producing the holographic patterns of the six regions Ha, Hb2, Hc2, Hd, He2 and Hf2 is in common the intersection of the dividing lines 4L, 4M and 4N (the center of the circle).

As shown in FIG. 7, the main light beam diffracted in the regions Ha and Hd in the six-segment holographic surface 41 is condensed as spots Sa and Sd at positions opposite to each other with reference to the points C1 and C4 on the section line LX in the four-segment photodetection part 60. Meanwhile, the main light beam diffracted in the regions Hb2, Hc2, He2 and Hf2 in the six-segment holographic surface 41 is condensed as spots Sb, Sc, Se and Sf in the vicinity of the section line LX in the four-segment photodetection part 60.

One sub light beam diffracted in the regions Ha and Hd in the six-segment holographic surface 41 is condensed as spots Qa and Qd on the section line LE in the two-segment photodetection part 61. One sub light beam diffracted in the regions Hb2 and Hc2 in the six-segment holographic surface 41 is condensed as spots Qb and Qc on the photodetection part E2. One sub light beam diffracted in the regions He2 and Hf2 is condensed as spots Qe and Qf on the photodetection part E1.

The other sub light beam diffracted in the regions Ha and Hd in the six-segment holographic surface 41 is condensed as spots Ra and Rd on the section line LF of the two-segment photodetection part 62. One sub light beam diffracted in regions Hb2 and Hc2 in the six-segment holographic surface 41 is condensed as spots Rb and Rc on the photodetection part F2, and one sub light beam diffracted in the regions He2 and Hf2 is condensed as spots Re and Rf on the photodetection part F1.

Thus, the condensed spot is divided into six, and two condensed spots Sa and Sd are positioned shifted from each other in opposite directions with respect to the intersection of the first and second section lines of the first photodector. Note that the points C1 and C4 are formed at positions apart from the central point C0 so that the condensed spots Sa and Sd do not go beyond the section line LY by a variation in the lasing wavelength of the semiconductor laser device 2.

Figure 10:
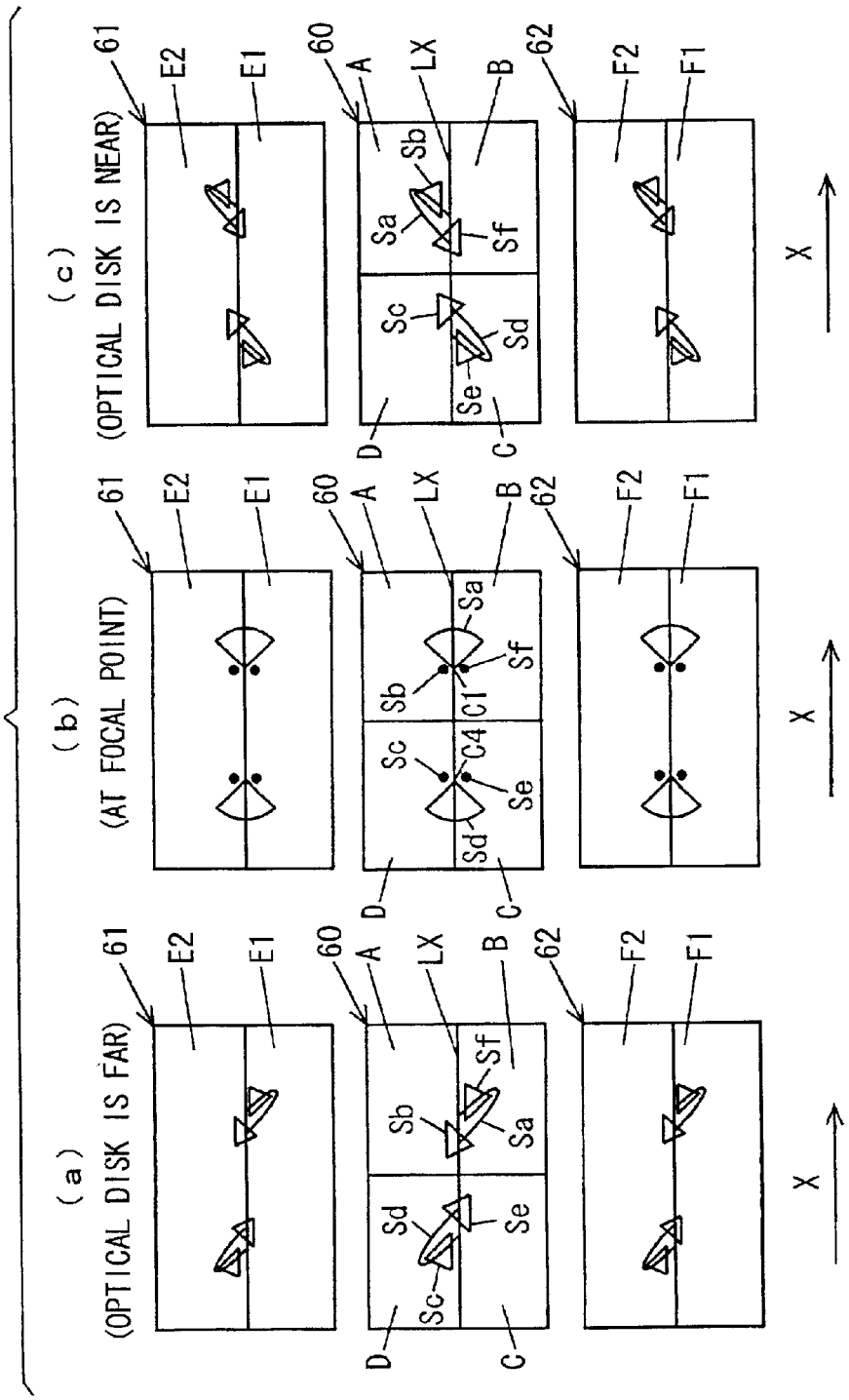
FIG. 10 is schematic plan views showing a condensed state on a photodetector according to the second embodiment.

FIG. 10 is schematic plan views showing the condensed state of the main and sub light beams on the photodetector according to the second embodiment.

When a focus error state is attained as the optical disk 1 is near to the objective lens 5, as shown in FIG. 10(c), the condensed spot Sa is in a shape elongated from the point C1 on the section line LX into the photodetection part A, the condensed spot Sd is in a shape elongated from the point C4 on the section line LX into the photodetection part C, and the condensed spots Sb, Sc, Se and Sf are expanded into spot shapes similar to those of the regions Hb2, Hc2, He2 and Hf2 of the six-segment holographic surface 41, respectively.

When a main light beam is focused (at the focal point) on the optical disk 1, as shown in FIG. 10(b), the condensed spot Sa is in the shape of a quarter circle centered at the point C1 on the section line LX and lying over the photodetection parts A and B. The condensed spot Sd is in the shape of a quarter circle centered at the point C4 on the section line LX and lying over the photodetection parts C and D. The condensed spots Sb, Sc, Se and Sf are focused as a point within the photodetection parts A, D, C and B, respectively.

Furthermore, when a focus error state is attained as the optical disk 1 is far from the objective lens 5, as shown in FIG. 10(a), the condensed spot Sa is in a shape elongated from the point C1 on the section line LX into the photodetection part B. The condensed spot Sd is in a shape elongated from the point C4 on the section lint LX into the photodetection part D. The condensed spots Sb, Sc, Se and Sf are expended into shapes similar to those of the regions Hb2, Hc2, He2 and Hf2 in the six-segment holographic surface 41. The condensed spots Sb, Sc, Se and Sf in this case are formed point-symmetrically to the condensed spots Sb, Sc, Se and Sf shown in FIG. 10(c), respectively where a focus error state is attained as the optical disk 1 is near to the objective lens 5.

The condensed spots Sb, Sc, Se and Sf thus deform based on the principle of the Foucault method.

Figure 11:
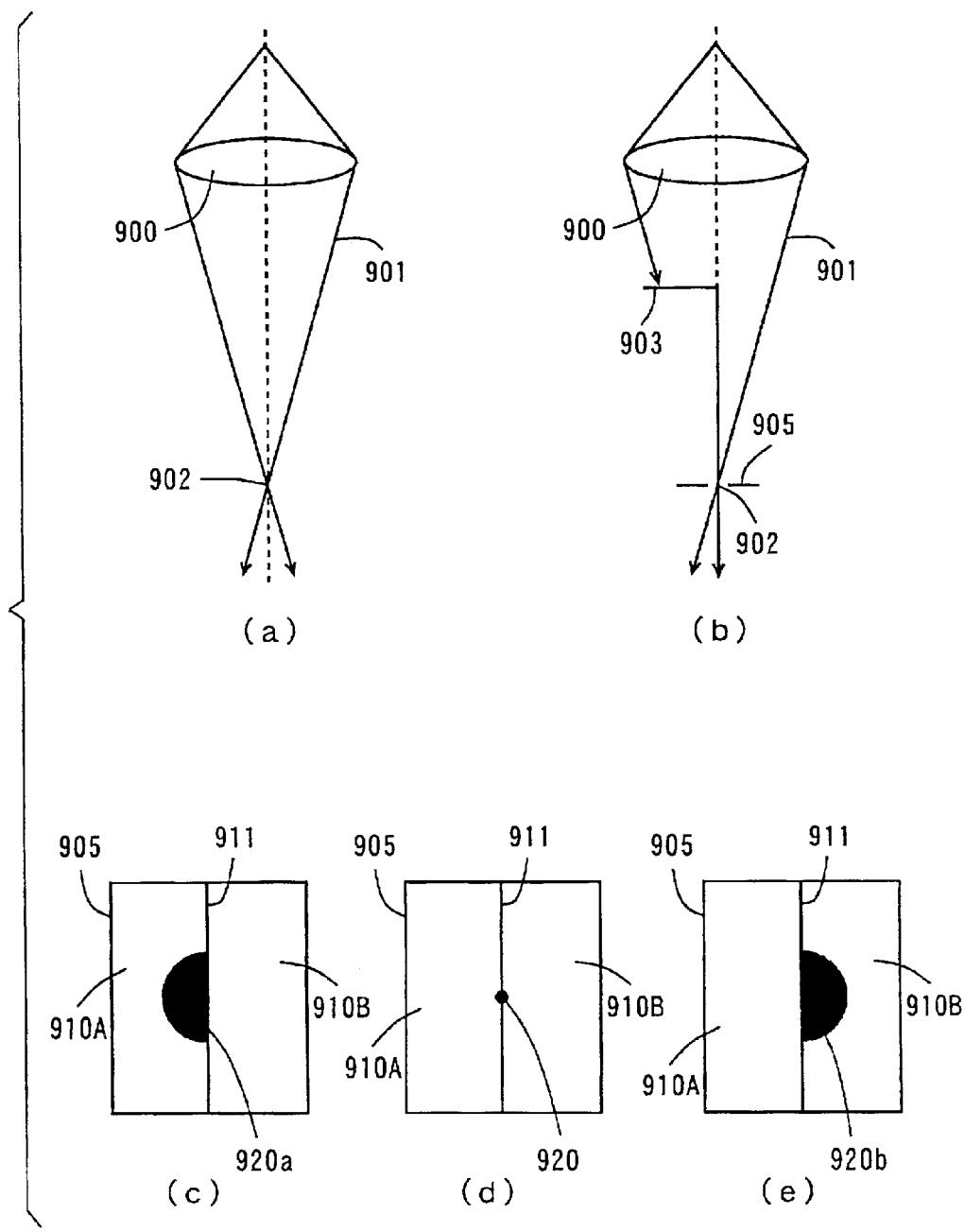
FIG. 11 is schematic views for use in illustration of the principle of the Foucault method.

According to the embodiment, a focus error is detected according to the astigmatism method in the first embodiment and the Foucault method which will be described. FIG. 11 is schematic views for use in illustration of the principle of the Foucault method.

In FIG. 11(a), a light beam 901 is converged by a lens 900 to a focal point 902. Herein, as shown in FIG. 11(b), a shielding plate 903 is provided for a half of the region of the light beam 901. In this case, the half of the light beam 901 is shielded by the shielding plate 903. The state of a light beam partly shielded by an object is referred to as "shading." The "shading" causes only half the light of the light beam to converge into the focal point 902.

A two-segment photodetector 905 is provided at the focal point 902. Herein, as shown in FIG. 11(d), the position of the two-segment photodetector 905 is adjusted such that the condensed spot 920 is formed on the section line 911 between the two-segment photodetectors 910A and 910B in the two-segment photodetector 905.

When the two-segment photodetector 905 is positioned at the focal point 902, a condensed spot 910 has a small dot shape. When the two-segment photodetector 905 is nearer to the lens 900 than the focal point 902, as shown in FIG. 11(e), a semicircular condensed spot 920b is formed on the photodetection part 910B in the two-segment photodetector 905.

When the two-segment photodetector 905 is at a further position with respect to the lens 900 than to the focal point 902, as shown in FIG. 11(c), a semi-circular condensed spot 920a is formed on the photodetection part 910A in the two-segment photodetector 905.

Condensed spots 920a and 920b formed on the photodetection parts 910A and 910B in the two-segment photodetector 905 are point-symmetric between when the two-segment photodetector 905 is at a position nearer to the lens 900 with respect to the focal point 902 and when the two-segment photodetector 905 is at a position further from the lens 900 with respect to the focal point 902. Therefore, using output signals fa and fb from the photodetectors 910A and 910B, the focus error signal FES can be obtained from the following expression:

$$FES = fa - fb \quad (4)$$

Based on whether the sign of the focus error signal FES is positive or negative, it can be determined whether the two-segment photodetector 905 is on the side near or far to/from the lens than the focal point 902.

The method of thus detecting the focus error based on a change in the condensed spot caused by the "shading" in the light beam is called "Foucault method" or "knife edge method."

Figure 12:
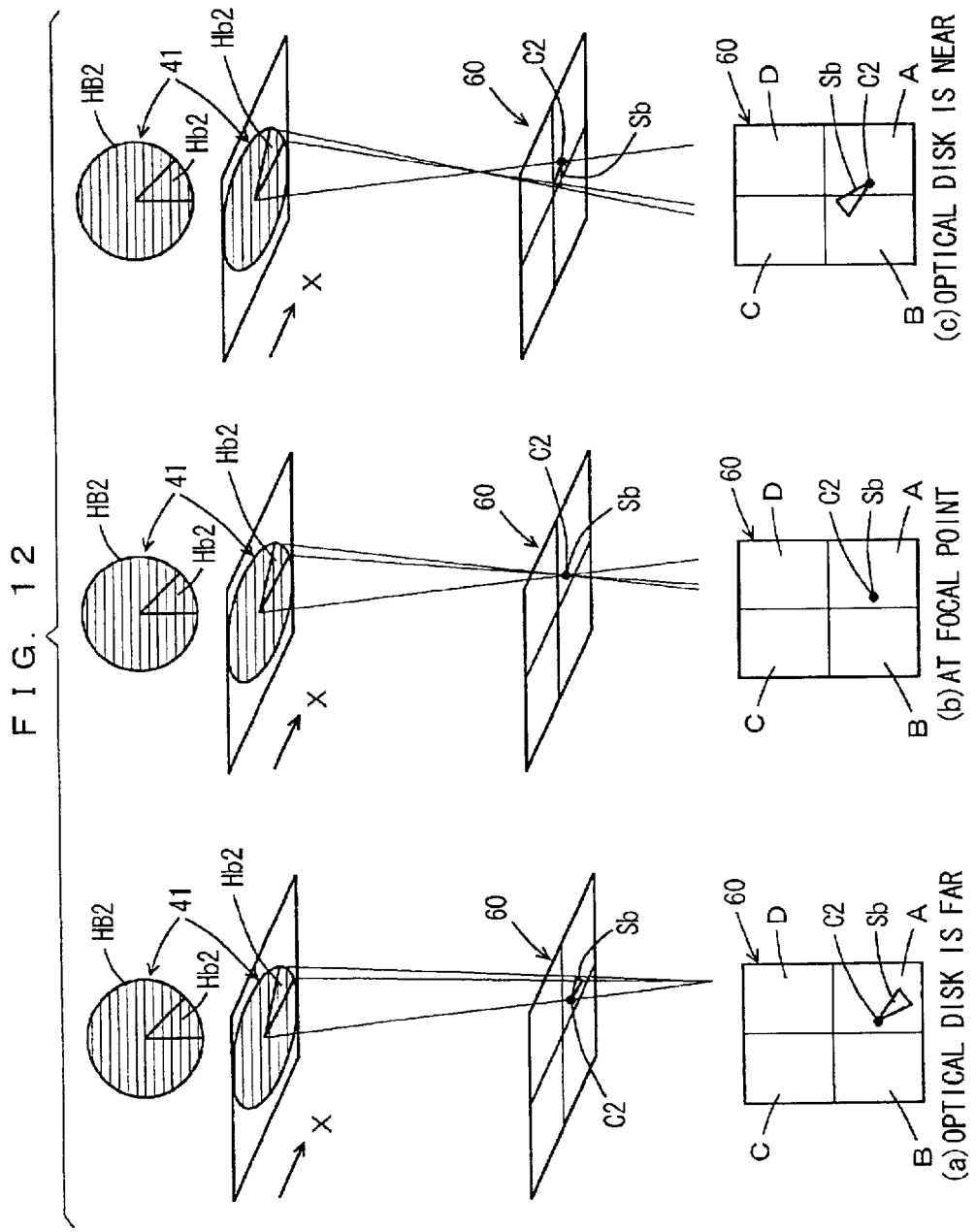
FIG. 12 is views for use in illustration of the principle of how a condensed spot deforms according to the Foucault method in the second embodiment.

FIG. 12 is views for use in illustration of the principle of how the condensed spot Sb deforms based on the Foucault method in the embodiment.

In the focused state in FIG. 12(b), a light beam from the region Hb2 in the six-segment holographic surface 41 is focused at the point C2 on the four-segment photodetection part 60. If the optical disk 1 is positioned nearer to the objective lens, the focal point of the light beam from the region Hb2 in the six-segment holographic surface 41 is behind the surface of the four-segment photodetection part 60, and therefore as shown in FIG. 12(a), a condensed spot Sb having a similar shape to that of the region Hb2 of the six-segment holographic surface 41 is formed on the four-segment photodetection part 60 with the point C2 as a peak.

When the optical disk 1 is far from the focused state, the focal point of the light beam from the region Hb2 in the six-segment surface 41 is positioned before the four-segment photodetection part 60. At a position beyond the focal point, the shape of the condensed spot is inverted with reference to the point C2, and therefore as shown in FIG. 12(c), a condensed spot Sb having a similar shape to that of the region Hb2 of the six-segment holographic surface 41 is formed at a position on the four-segment photodetection 60 which is point-symmetric with respect to the point C2 to the condensed spot Sb in FIG. 12(a) where the optical disk 1 is near. As a result, when the optical disk 1 is far, the output signal PA from the photodetection part A in the four-segment photodetection part 60 has a lowered level, and the output signal PB from the photodetection part B has a raised level. This similarly applies to the deformation of the condensed spots Sc, Se and Sf.

Also according to the embodiment, similarly to the first embodiment, the direction of the shift of the optical disk 1 from the focal point position is determined based on the sign of the focus error signal FES according to the expression (1), and the condensed state on the optical disk 1 can be corrected. In this case, not only the condensed spots Sa and Sd by the main light beam from the regions Ha and Hd in the six-segment holographic surface 41, but also the condensed spots Sb, Sc, Se and Sf by the main light beam from the regions Hb2, Hc2, He2 and Hf2 on the six-segment holographic surface 41 greatly contribute to the focus error signal FES.

Thus, if the focal point is shifted, almost the entire light quantity of the condensed spots contribute to the focus error signal FES, and therefore the focus error can be detected with high sensitivity.

Also according to the embodiment, similarly to the first embodiment, the tracking error offset can be compensated according to the differential push-pull method based on the tracking error signal TES by the expression (3).

Herein, if the points C2, C3, C5 and C6 are set on the section line LX of the photodetector 6, the effect by the Foucault method is more significant, while the area on the section line LX is a non-sensitive area, and the amplitude of a reproducing signal HFS would be disadvantageously reduced because the total light quantity in the focused state is reduced. Therefore, the points C2, C6 or the points C3, C5 are set at positions as near as possible to the section line LX.

Figure 13:
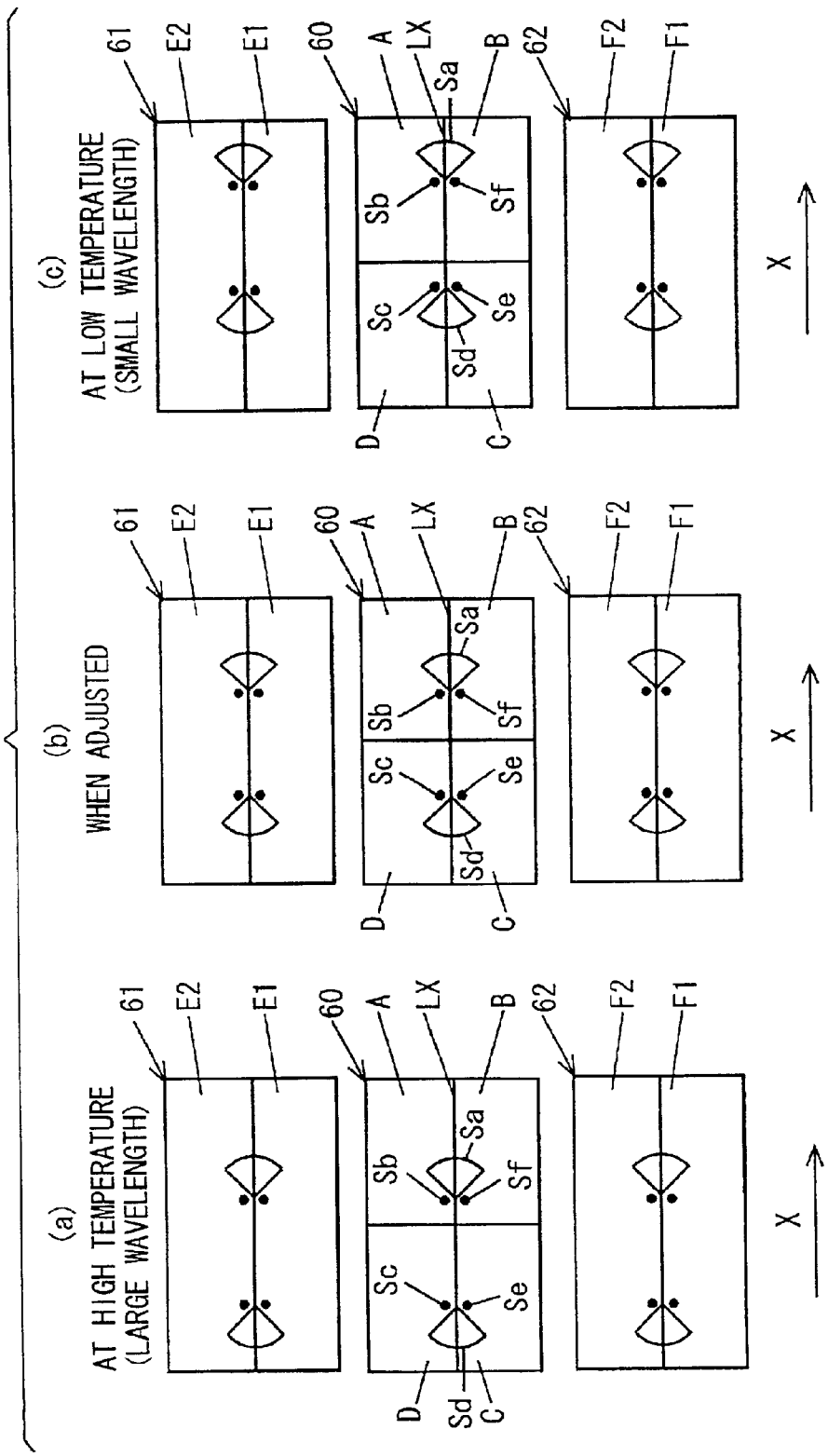
FIG. 13 is schematic plan views showing the movement of condensed spots on a photodetector caused by a variation in the lasing wavelength of a semiconductor laser device.

FIG. 13 is schematic plan views showing the movement of the condensed spots on the photodetector 6 by a variation in the lasing wavelength of the semiconductor laser device 2. FIG. 13(a) shows condensed spots when the lasing wavelength is longer at a higher ambient temperature, FIG. 13(b) shows a condensed spot at the time of adjustment, and FIG. 13(c) shows a condensed spot when the lasing wavelength is shorter at a lower ambient temperature.

Also in the embodiment, similarly to the first embodiment, when the lasing wavelength of the semiconductor laser device 2 changes depending upon the ambient temperature, the condensed spot Sa moves within the range of the photodetection parts A and B along the section line LX, while the condensed spot Sd moves within the range of the photodetection parts C and D along the section line LX. Therefore, the output signals PA, PB, PC and PD are unaffected. The condensed spots Sb, Sc, Se and Sf move within the range of the photodetection parts A, D, C and B, and the output signals PA, PD, PC and PB are unaffected.

(3) Third Embodiment

The optical positional relation between the far-field pattern (beam section intensity distribution) spot of a laser beam emitted from a semiconductor laser device 2 in FIG. 1 and a six-segment holographic surface 40 or 41 is set as follows, so that the accuracy of the focus error signal FES can be improved.

Figure 14:
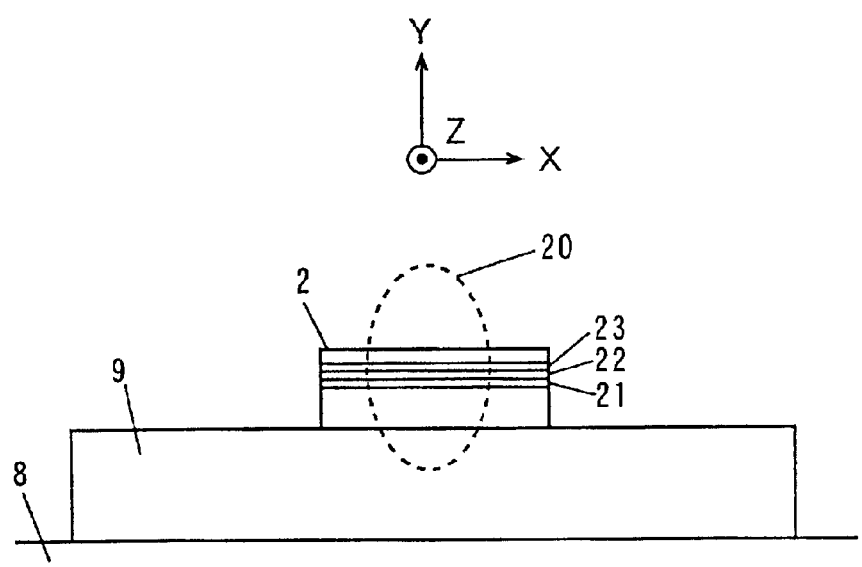
FIG. 14 is a top view of the semiconductor laser device in the optical pickup apparatus shown in FIG. 1.

FIG. 14 is a top view of the semiconductor laser device 2 in an optical pickup apparatus 100 as shown in FIG. 1.

As shown in FIG. 14, the semiconductor laser device 2 mainly includes a cladding layer 21, an active layer 22 and a cladding layer 23. The spread angle of a laser beam emitted from the active layer 22 of the semiconductor laser device 2 in the vertical direction (the direction perpendicular to the active layer 22) is larger than the spread angle in the horizontal direction (the direction parallel to the active layer 22). As a result, the far-field pattern 20 of the laser beam is in an elliptical shape having its major axis being perpendicular to the active layer 22.

In the optical pickup apparatus 100 according to the embodiment, the active layer 22 of the semiconductor laser device 2 is provided at a side surface of a heat sink 9 so that the layer is set perpendicular to the Y-direction. As a result, the far-field pattern 20 of the laser beam is in an elliptical shape having its major axis being parallel to the Y-direction and its minor axis being parallel to the X-direction.

Figure 15:
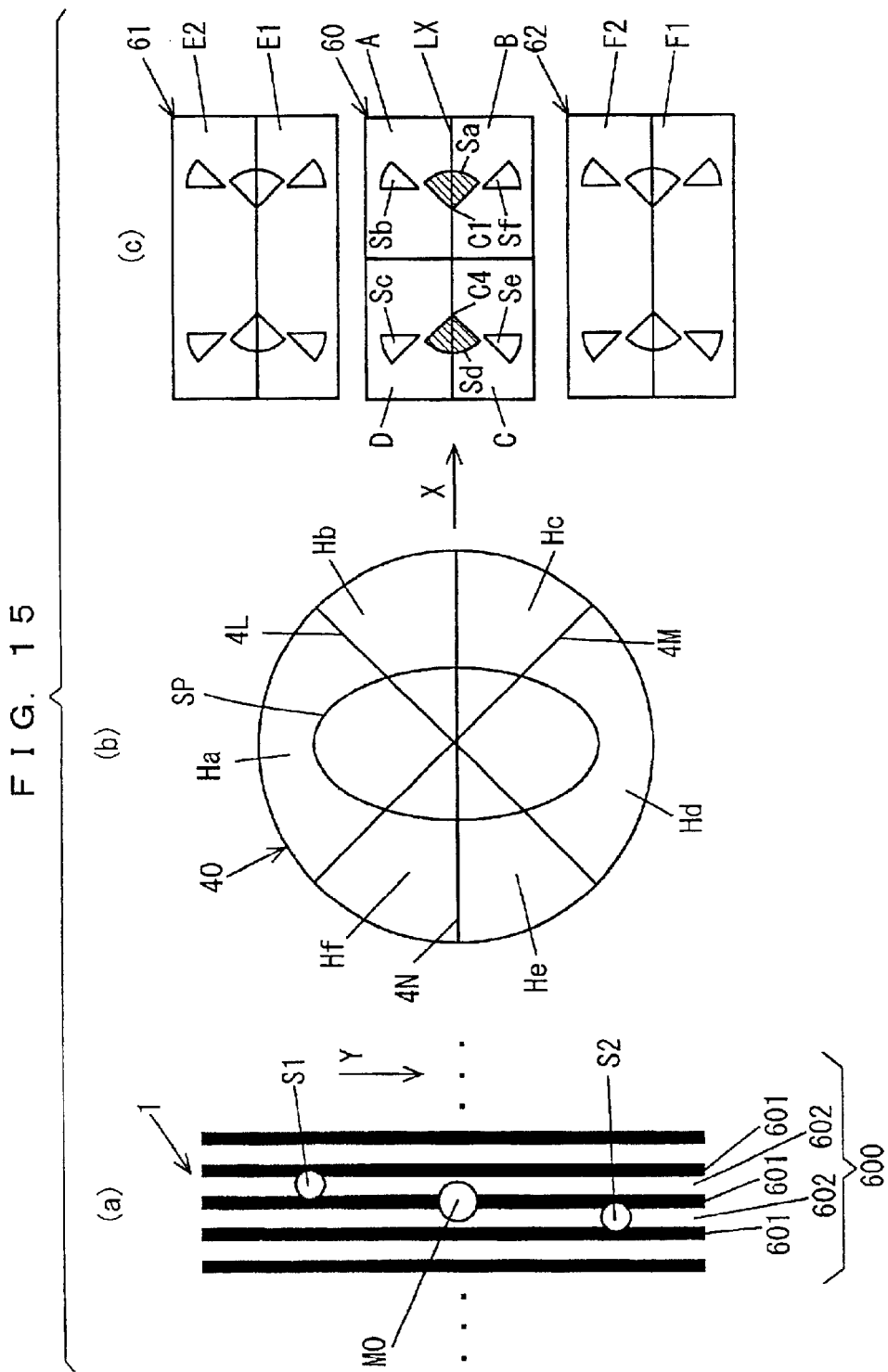
FIG. 15 is schematic plan views showing the relation between condensed spots on an optical disk, those on a six-segment holographic surface and condensed spots on a photodetector.

FIG. 15 is schematic plan views showing the relation among the condensed spot on the optical disk 1, the cross-sectional spot on the six-segment holographic surface 40 and the condensed spot on the photodetector.

As shown in FIG. 15(a), a pre-groove 600 including land parts 601 and groove parts 602 is formed on the optical disk 1. A main spot M0 by a main light beam is formed at the land part 601 in the optical disk 1 and sub spots S1 and S2 by sub light beams are formed at the groove parts 602 on both sides of the land part 601.

As shown in FIG. 15(b), the cross-sectional spot SP of a returned light beam formed at the six-segment holographic surface 40 is in an elliptical shape having its major axis extending in the regions Ha and Hd and its minor axis extending along a dividing line 4N. Thus, the light quantity of the returned light beam coming into regions Ha and Hd is greater than the light quantity of the returned light beam coming into regions Hb, Hc, He and Hf.

Therefore, as shown in FIG. 15(c), the light intensity of the condensed spots Sa and Sd formed on the four-segment photodetection part 60 is greater than the light intensity of the condensed spots Sb, Sc, Se and Sf. Thus, the light quantity of the condensed spots Sa and Sd greatly contributing to the focus error signal FES increases, and therefore the focus error signal FES in a sufficient level can be obtained.

When the main spot M0 is shifted in the radial direction of the optical disk 1 from the center of the land part 601, the light spot SP on the six-segment holographic surface 40 moves along the dividing line 4N. Thus, there arises a difference between the total light quantity of the condensed spots Sb and Sc and the total light quantity of the condensed spots Se and Sf on the four-segment photodetection part 60. There also arises a difference between the total light quantity of condensed spots Qb and Qc and the total light quantity of condensed spots Qe and Qf on the two-segment photodetection part 61. Meanwhile, there arises a difference between the total light quantity of the condensed spots Rb and Rc and the total light quantity of the condensed spots Re and Rf on the two-segment photodetection part 62.

Therefore, the tracking error signal TES according to the differential push-pull method can be obtained based on the above expression (3).

In this case, the condensed spots Sb, Sc, Se and Sf on the four-segment photodetection part 60, the condensed spots Qb, Qc, Qe and Qf on the two-segment photodetection part 61, and condensed spots Rb, Rc, Re and Rf on the two-segment photodetection part 62 greatly contribute to the tracking error signal TES.

At the six-segment holographic surface 40 according to the first embodiment, the condensed spots Sb, Sc, Se and Sf contributing to the tracking error signal TES are formed in the central part of the photodetection parts A, D, C and B. The condensed spots Qb, Qc are formed in the photodetection part E2, and the condensed spots Qe and Qf are formed in the photodetection part E1. The condensed spots Rb and Rc are formed in the photodetection part F2 and the condensed spots Re and Rf are formed in the photodetection part F1. Therefore, the tracking error signal TES is stabilized. As a result, highly accurate tracking servo control is enabled. The same result is obtained using the six-segment holographic surface 41 according to the second embodiment.

Figure 17:
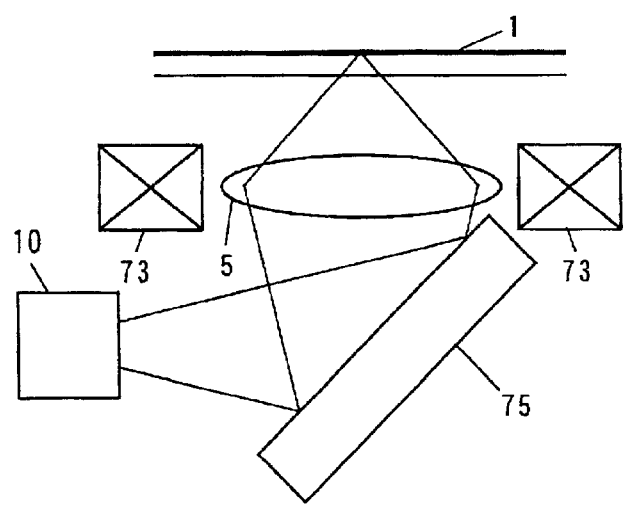
FIG. 17 is a view showing a second arrangement example of the holographic unit in the optical pickup apparatus shown in FIG. 1.

FIG. 16 is a schematic view showing a first arrangement example of a holographic unit 10 in the optical pickup apparatus according to the first or second embodiment. FIG. 17 is a schematic view showing a second arrangement example of the holographic unit 10 in the optical pickup apparatus according to the first or second embodiment.

In the example shown in FIG. 16, a laser beam is emitted perpendicularly to the optical disk 1 from the holographic unit 10, and condensed on the recording medium surface of the optical disk 1 by the objective lens 5. In the example in FIG. 17, a laser beam is emitted parallel to the optical disk 1 from the holographic unit 10, reflected perpendicularly to the optical disk 1 by a reflection mirror 75, and condensed on the recording medium surface of the optical disk 1 by the objective lens 5. In the example shown in FIG. 17, the optical pickup apparatus may be reduced in thickness.

Figure 18:
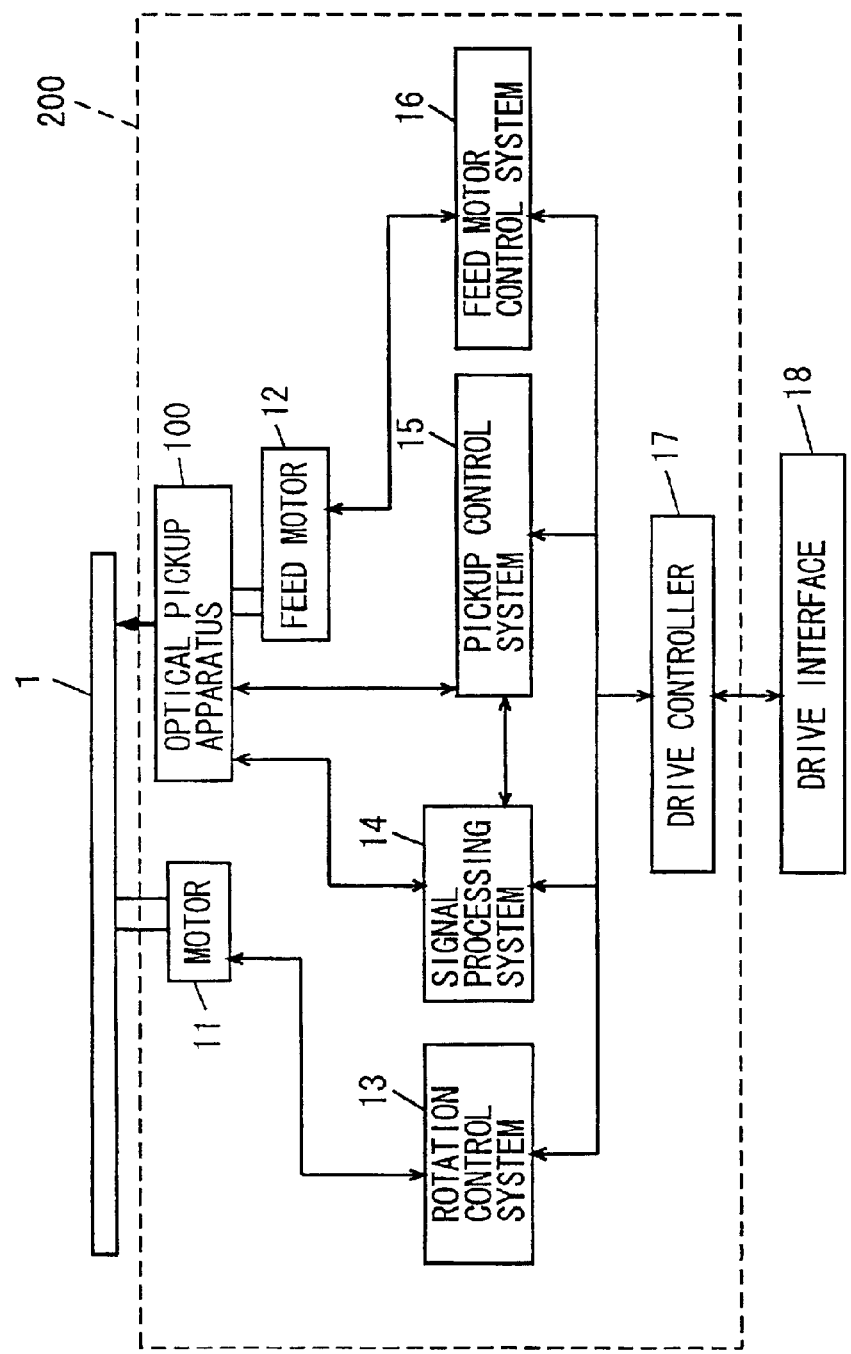
FIG. 18 is a block diagram showing the configuration of an optical recording medium drive using the optical pickup apparatus shown in FIG. 1.

FIG. 18 is a block diagram showing the configuration of an optical recording medium drive 200 using the optical pickup apparatus 100 according to the above embodiments. The optical recording medium drive 200 of FIG. 8 is an optical disk drive reading information from the optical disk 1.

The optical recording drive 200 includes the optical pickup apparatus 100, a motor 11, a feed motor 12, a rotation control system 13, a signal processing system 14, a pickup control system 15, a feed motor control system 16 and a drive controller 17.

The motor 11 rotates the optical disk 1 at a prescribed speed. The rotation control system 13 controls the rotational operation of the motor 11. The feed motor 12 moves the optical pickup apparatus 100 in the radial direction of the optical disk 1. The feed motor control system 16 controls the operation of the feed motor 12. The optical pickup apparatus 100 irradiates the optical disk 1 with a laser beam and receives a returned beam from the optical disk 1. The pickup control system 15 controls the projecting/photoreceiving operation of the optical pickup apparatus 100.

The signal processing system 14 receives an output signal from a photodetector 6 in the optical pickup apparatus 100 and calculates a reproduction signal, a focus error signal and a tracking error signal for supplying the reproduction signal to the drive controller 17 while supplying the focus error signal and the tracking error signal to the pickup control system 15. The drive controller 17 controls the rotation control system 13, the signal processing system 14, the pickup control system 15 and the feed motor control system 16 based on instructions supplied through a drive interface 18, and outputs the reproduction signal through the drive interface 18.

According to this embodiment, the motor 11 and the rotation control system 13 correspond to the rotation driving mechanism, the feed motor 12 and the feed motor control system 16 correspond to the pickup driving mechanism, and the signal processing system 14 corresponds to the signal processing part.

The optical recording medium drive 200 shown in FIG. 18 employs the optical pickup apparatus 100 according to the embodiments described above, and therefore an accurate focus error signal can be obtained when there are variations in the wavelength of the laser beam. Thus, focus servo control is performed with high accuracy, so that a high-quality reproduction signal is obtained.

The above described embodiments employ the transmission-type holographic optical element 4 as the first diffraction element, while a reflection-type diffraction element such as a reflection-type holographic optical element may be used as the first diffraction element.

The above described embodiments employ the transmission-type diffraction grating 3 as the second diffraction element, while the present invention is also applicable to an optical pickup apparatus employing a reflection-type diffraction grating as the second diffraction element.

Furthermore, as shown in FIG. 17, a reflection member such as a mirror may be interposed between the light source and the optical recording medium to refract the optical path.

Figure 19:
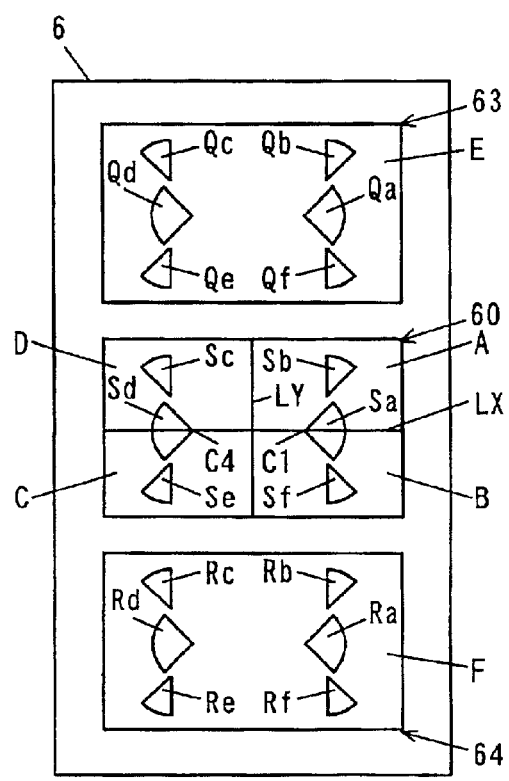
FIG. 19 is a schematic plan view of a photodetector when the three-beam method is used.
Figure 20:
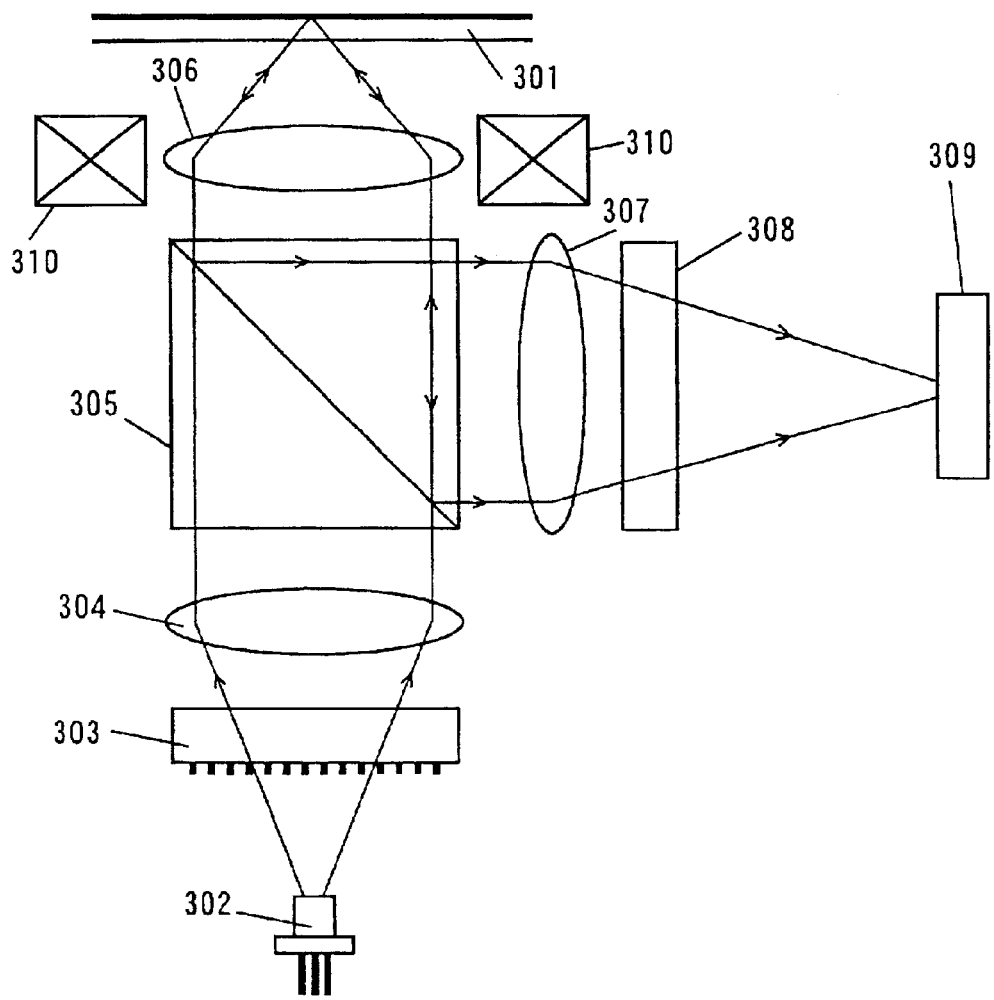
FIG. 20 is a schematic view of a conventional optical pickup apparatus for a recordable optical disk.
Figure 22:
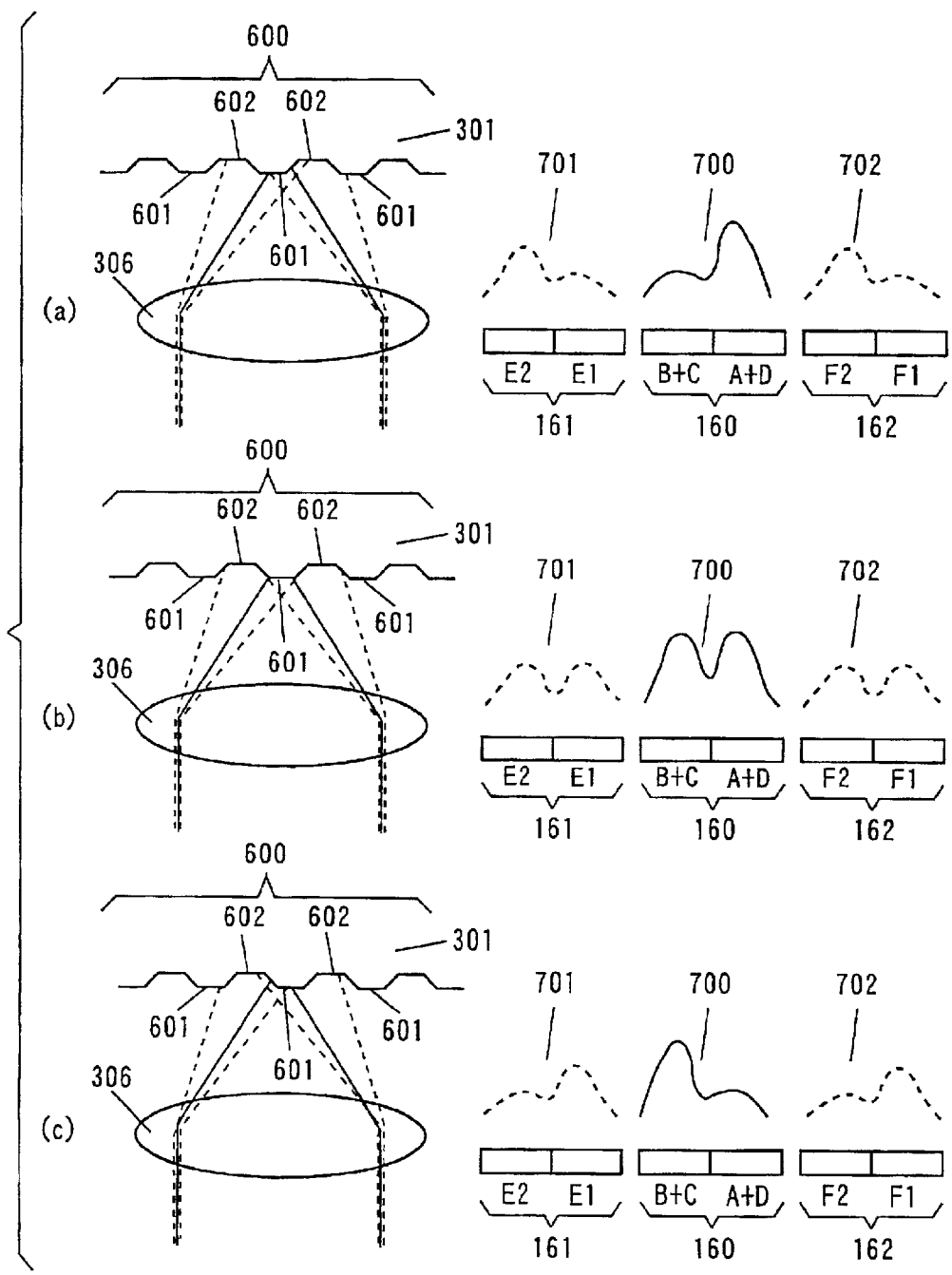
FIG. 22 is views for use in illustration of tracking servo control according to the push-pull method and the differential push-pull method.
Figure 23:
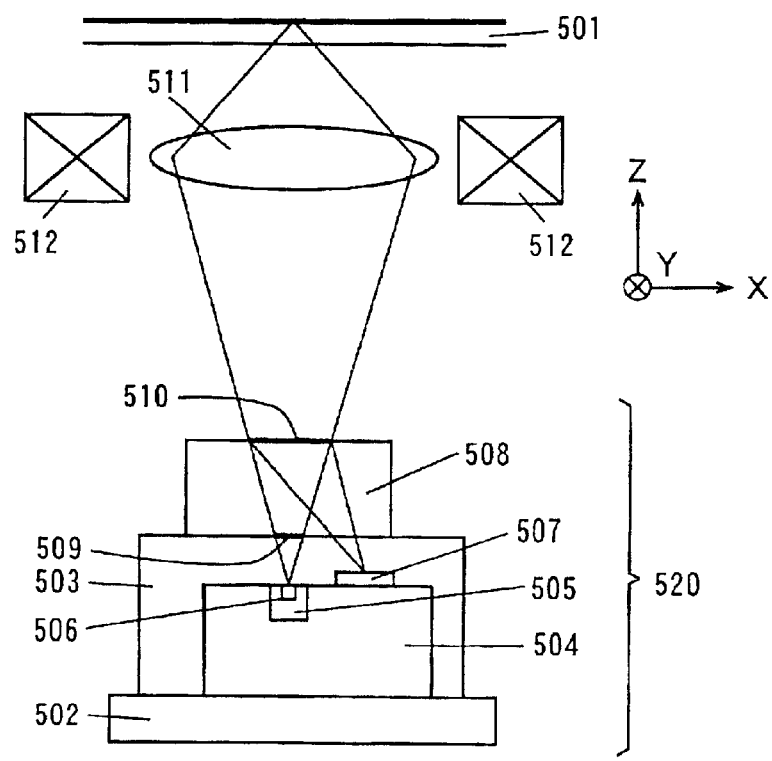
FIG. 23 is a schematic view of a conventional optical pickup apparatus using a holographic optical element.
Figure 24:
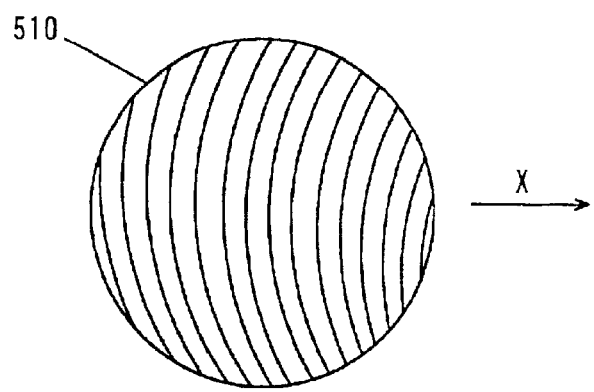
FIG. 24 is a plan view of the holographic surface of a holographic optical element in the optical pickup apparatus in FIG. 23.
Figure 25:
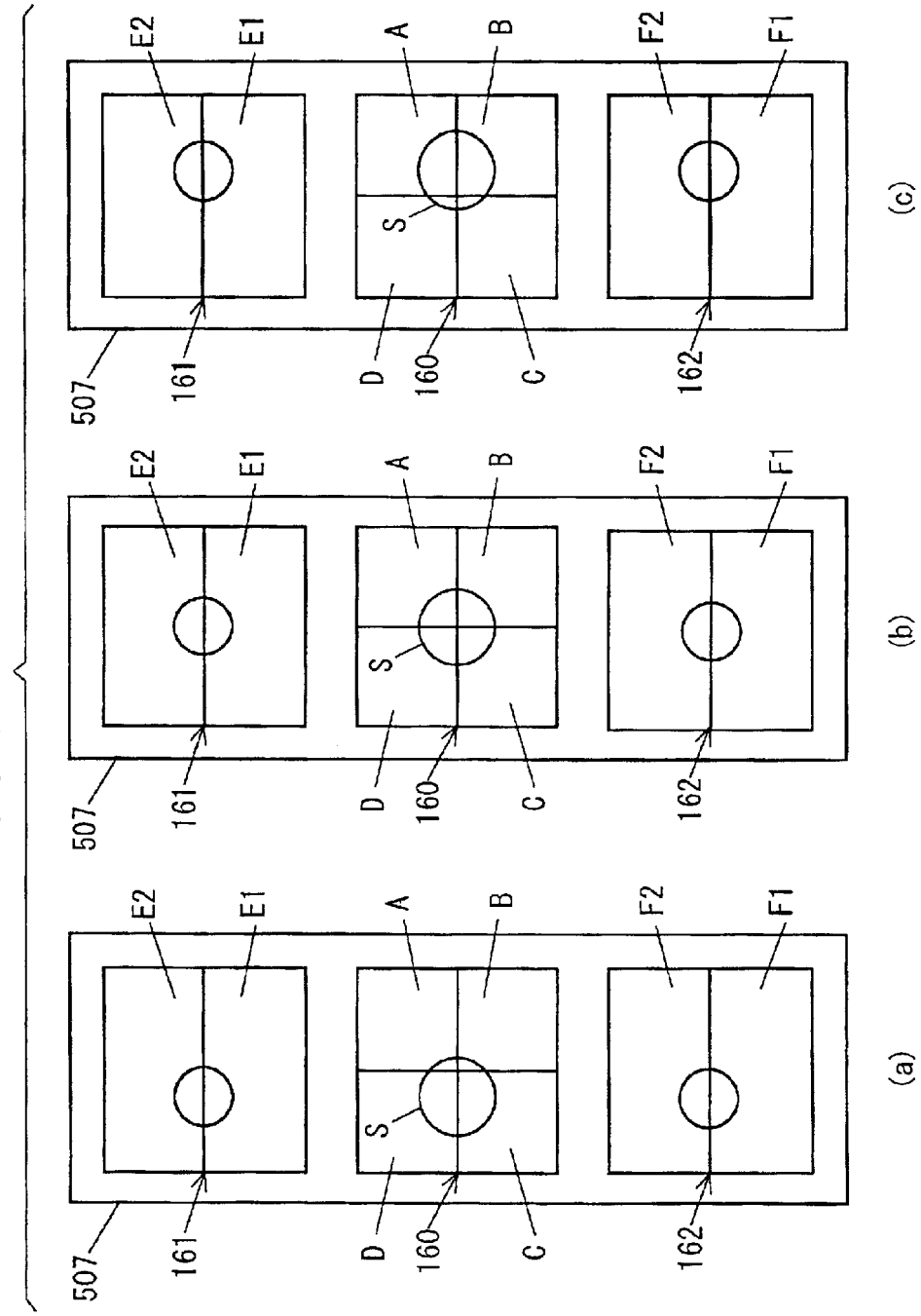
FIGS. 25 is schematic plan views showing the movement of a condensed spot on a photodetector caused by a variation in the lasing wavelength of a semiconductor laser device in the optical pickup apparatus in FIG. 23.

In addition, the diffraction grating 3 and the transmission-type holographic optical element 4 may be integrated into a single optical element for use. Further, tracking servo control may be performed by a method other than the aforementioned differential push-pull method. If the method is only for a ROM optical disk such as a CD-ROM, the three-beam method may be employed. FIG. 19 is a schematic plan view showing a photodetector when the three-beam method is employed. As shown in FIG. 19, a photodetector 6 having photodetection parts 63 and 64 is used. In this case, if the outputs of photodetection parts E and F are referred to as PE and PF, respectively, the tracking error signal TES can be obtained from the following expression:

$$TES = PE - PF \tag{5}$$

The DPD (Differential Phase Detection) method can be employed using only the four-segment photodetector 60 in the center of the photodetector 6. In this case, if the outputs of the photodetection parts A, B, C and D are referred to as PA, PB, PC and PD, respectively, the following expressions representing a reproduction signal HFS and a diagonal differential signal DDS result.

$$HFS = PA + PB + PC + PD \tag{6}$$

$$DDS = (PA + PC) - (PB + PD) \tag{7}$$

Then, the phase of the diagonal differential signal DDS can be detected with reference to the reproduction signal HFS to obtain the tracking error signal TES.

Note that the aperture shape of the holographic optical element 4 is circular according to the above-described embodiments, while other shapes such as a regular square may be employed.

What is claimed is:

1. An optical pickup apparatus, comprising:

a light source emitting a light beam;

a first diffraction element diffracting a returned light beam based on the light beam emitted from said light source; and a first photodetector detecting the returned light beam diffracted by said first diffraction element, wherein said first diffraction element having two regions in first diagonal positions among four regions, divided by a first dividing line at an approximately 45° to a direction of diffracting the returned beam and a second dividing line orthogonal to the first dividing line, as first and second regions, and third, fourth, fifth and sixth regions obtained by equally dividing the remaining two regions in second diagonal positions by a third dividing line, wherein said first photodetector has four photodetection parts sectioned by a first section line substantially parallel to the direction in which a condensed spot of the returned light beam diffracted by said first diffraction element is moved by a variation in the wavelength of said light source and a second section line orthogonal to said first section line, wherein the returned light beam diffracted in said first and second regions of said first diffraction element forms first and second condensed spots at positions apart from each other on opposite sides on said first section line with respect to the intersection of said first and second section lines of said photodetector, wherein the returned light beam diffracted in said third, fourth, fifth and sixth regions of said first diffraction element forms condensed spots on the four photodetection parts of said first photodetector or on said first section line, wherein the first, second, third, fourth, fifth and sixth regions of said first diffraction element provides each light beam with a spatial variation corresponding to a focus state on an optical recording medium so that the focus state can be detected by operating the outputs of the four photodetection parts in said first photodetector, and wherein the spatial variation corresponding to said focus state provided by at least said first and second regions is astigmatism, and wherein said first and second condensed spots each move among the different photodetection parts depending on said focus state.

2. The optical pickup apparatus according to claim 1, wherein the returned light beam diffracted in the third, fourth, fifth and sixth regions of said first diffraction element forms condensed spots substantially in the center of the four photodetection parts in said first photodetector.

3. The optical pickup apparatus according to claim 2, further comprising:

a second diffraction element provided in an optical path between said light source and said first diffraction element, and splitting a light beam emitted from said light source into a main light beam and first and second sub light beams;

a second photodetector having two photodetection parts divided into two by a section line substantially parallel to said first section line of said first photodetector; and a third photodetector having two photodetection parts divided into two by a section line substantially parallel to said first section line of said first photodetector, said first diffraction element diffracting a first returned light beam from said optical recording medium based on said main light beam and guiding said diffracted light beam into said first photodetector, while diffracting second and third returned light beams from said optical recording medium based on said first and second sub light beams and guiding said diffracted light beams into said second and third photodetectors, said first returned light beam diffracted in said first and second regions of said first diffraction element forming condensed spots at positions apart from each other on opposite sides on said first section line with respect to the intersection of the first and second section lines of said first photodetector, said first returned light beam diffracted in said third, fourth, fifth and sixth regions of said first diffraction element forming condensed spots substantially in the center of the four photodetection parts in said first photodetector, said second returned light beam diffracted in said first and second regions of said first diffraction element forming condensed spots on the section line of said second photodetector, said second returned light beam diffracted in said third, fourth, fifth and sixth regions of said first diffraction element forming condensed spots in two photodetection parts in said second photodetector, said third returned light beam diffracted in said first and second regions of said first diffraction element forming condensed spots on the section line of said third photodetector, said third, fourth, fifth and sixth regions of said first diffraction element forming condensed spots in the two photodetection parts in said third photodetector.

4. The optical pickup apparatus according to claim 1, wherein said astigmatism is provided in a direction substantially at 45° with respect to said first and second section lines of said first photodetector.

5. The optical pickup apparatus according to claim 1, wherein said first and second dividing lines of said first diffraction element form an angle of about 45° with respect to said first and second section lines of said first photodetector, and said third dividing line of said first diffraction element is substantially parallel to said first section line of said first photodetector.

6. The optical pickup apparatus according to claim 1, wherein said light source emits a light beam having a far-field pattern in an elliptical shape, said returned light beam forms a light spot in an elliptical shape at said first diffraction element, the positional relation between said light source and said first diffraction element is set so that the minor axis of said light spot in the elliptical shape extends substantially parallel to said third dividing line of said first diffraction element, and the major axis extends in said first and second regions of said first diffraction element.

7. An optical pickup apparatus comprising:

a light source emitting a light beam;

a first diffraction element diffracting a returned light beam based on the light beam emitted from said light source; and a first photodetector detecting the returned light beam diffracted by said first diffraction element, wherein said first diffraction element has two regions in first diagonal positions among four regions, divided by a first dividing line at an approximately 45° to a direction of diffracting the returned beam and a second dividing line orthogonal to the first dividing line, as first and second regions, and third, fourth, fifth and sixth regions obtained by equally dividing the remaining two regions in second diagonal positions by a third dividing line, wherein said first photodetector has four photodetection parts sectioned by a first section line substantially parallel to the direction in which a condensed spot of the returned light beam diffracted by said first diffraction element is moved by a variation in the wavelength of said light source and a second section line orthogonal to said first section line, wherein the returned light beam diffracted in said first and second regions of said first diffraction element forms first and second condensed spots at positions apart from each other on opposite sides on said first section line with respect to the intersection of said first and second section lines of said photodetector, wherein the returned light beam diffracted in said third, fourth, fifth and sixth regions of said first diffraction element forms condensed spots on the four photodetection parts of said first photodetector or on said first section line, wherein the first, second, third, fourth, fifth and sixth regions of said first diffraction element provide each light beam with a spatial variation corresponding to a focus state on an optical recording medium so that the focus state can be detected by operating the outputs of the four photodetection parts in said first photodetector, wherein the returned light beam diffracted in the third, fourth, fifth and sixth regions of said first diffraction element forms condensed spots substantially in the center of the four photodetection parts in said first photodetector, and wherein said first, second, third, fourth, fifth and sixth regions of said first diffraction element are formed to share the intersection of said first, second, and third dividing lines of said first diffraction element as a common origin, said first and second regions of said first diffraction element have grating patterns set with reference to two points on said first section line apart from each other from the intersection of said first and second section lines of said first photodetector, and said third, fourth, fifth and sixth regions of said first diffraction element have grating patterns set with respect to substantial centers of the four photodetection parts in said first photodetector, wherein the spatial variation corresponding to said focus state provided by at least said first and second regions is astigmatism, and wherein said first and second condensed spots each move among the different photodetection parts depending on said focus state.

8. The optical pickup apparatus according to claim 7, wherein the spatial variation corresponding to said focus state is astigmatism.

9. The optical pickup apparatus according to claim 8, wherein said astigmatism is provided in a direction substantially at 45° with respect to said first and second section lines of said first photodetector.

10. The optical pickup apparatus according to claim 8, further comprising:

a second diffraction element provided in an optical path between said light source and said first diffraction element, and splitting a light beam emitted from said light source into a main light beam and first and second sub light beams;

a second photodetector having two photodetection parts divided into two by a section line substantially parallel to said first section line of said first photodetector; and a third photodetector having two photodetection parts divided into two by a section line substantially parallel to said first section line of said first photodetector, said first diffraction element diffracting a first returned light beam from said optical recording medium based on said main light beam and guiding said diffracted light beam into said first photodetector, while diffracting second and third returned light beams from said optical recording medium based on said first and second sub light beams and guiding said diffracted light beams into said second and third photodetectors, said first returned light beam diffracted in said first and second regions of said first diffraction element forming condensed spots at positions apart from each other on opposite sides on said first section line with respect to the intersection of the first and second section lines of said first photodetector, said first returned light beam diffracted in said third, fourth, fifth and sixth regions of said first diffraction element forming condensed spots substantially in the center of the four photodetection parts in said first photodetector, said second returned light beam diffracted in said first and second regions of said first diffraction element forming condensed spots on the section line of said second photodetector, said second returned light beam diffracted in said third, fourth, fifth and sixth regions of said first diffraction element forming condensed spots in two photodetection parts in said second photodetector, and said third returned light beam diffracted in said first and second regions of said first diffraction element forming condensed spots on the section line of said third photodetector, said third, fourth, fifth and sixth regions of said first diffraction element forming condensed spots in the two photodetection parts in said third photodetector.

* * * * *